United States Patent
Wenzel et al.

(10) Patent No.: US 9,322,566 B2
(45) Date of Patent: *Apr. 26, 2016

(54) SYSTEMS AND METHODS FOR CONTROLLING ENERGY USE DURING A DEMAND LIMITING PERIOD

(71) Applicant: Johnson Controls Technology Company, Holland, MI (US)

(72) Inventors: Michael J. Wenzel, Oak Creek, WI (US); Kirk H. Drees, Cedarburg, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,053

(22) Filed: Sep. 22, 2014

(65) Prior Publication Data

US 2015/0045962 A1     Feb. 12, 2015

Related U.S. Application Data

(63) Continuation of application No. 13/251,134, filed on Sep. 30, 2011, now Pat. No. 8,843,238.

(51) Int. Cl.
*F24F 11/00* (2006.01)
*F24F 5/00* (2006.01)
(Continued)

(52) U.S. Cl.
CPC ........... *F24F 11/006* (2013.01); *F24F 11/0009* (2013.01); *G05D 23/1923* (2013.01); *G05F 1/66* (2013.01); *F24F 2011/0075* (2013.01)

(58) Field of Classification Search
CPC .............. G06F 1/3203; F24F 2011/075; F24F 11/0012; F24F 2011/0016; F24F 2011/0049; F24F 2011/0063; H04L 12/14; H04L 12/2803; G06Q 30/0201; G06Q 30/0202; G06Q 30/0206
USPC ......... 700/28, 33, 36, 37, 277, 286, 291, 295, 700/300; 702/57, 60–62; 705/7.29, 7.31, 705/7.35; 236/44 C, 49.3, 91 D; 340/539.22, 340/539.26–539.28, 540; 374/29, 30
See application file for complete search history.

(56) References Cited

U.S. PATENT DOCUMENTS 3,872,286 A     3/1975 Putman
4,497,031 A *  1/1985 Froehling ........... F24F 11/0009
                                                165/212

(Continued)

FOREIGN PATENT DOCUMENTS

EP      0 994 345      4/2000

OTHER PUBLICATIONS

Lee et al., "Evaluation of methods for determining demand-limiting setpoint trajectories in buildings using short-term measurements", Science Direct Building and Environment, vol. 43, Issue 10, Oct. 2008, pp. 1769-1783.

(Continued)

*Primary Examiner* — Crystal J Barnes-Bullock
(74) *Attorney, Agent, or Firm* — Foley & Lardner LLP

(57) ABSTRACT

Systems and methods for limiting power consumption by a heating, ventilation, and air conditioning (HVAC) subsystem of a building are shown and described. A feedback controller is used to generate a manipulated variable based on an energy use setpoint and a measured energy use. The manipulated variable may be used for adjusting the operation of an HVAC device.

20 Claims, 9 Drawing Sheets

(51) Int. Cl.
G05D 23/19 (2006.01)
G05F 1/66 (2006.01)

(56) References Cited

U.S. PATENT DOCUMENTS

| | | |
|---|---|---|
| 5,244,148 A | 9/1993 | Vandermeyder |
| 5,568,377 A | 10/1996 | Seem et al. |
| 6,122,605 A | 9/2000 | Drees et al. |
| 6,154,681 A | 11/2000 | Drees et al. |
| 6,185,483 B1 | 2/2001 | Drees |
| 6,219,590 B1 | 4/2001 | Bernaden, III et al. |
| 6,341,599 B1 | 1/2002 | Hada et al. |
| 6,430,985 B1 | 8/2002 | Drees |
| 6,477,439 B1 | 11/2002 | Bernaden, III et al. |
| 6,896,404 B2 | 5/2005 | Seki et al. |
| 7,024,254 B2 | 4/2006 | Salsbury et al. |
| 7,130,719 B2 | 10/2006 | Ehlers et al. |
| 7,346,433 B2 | 3/2008 | Budike, Jr. |
| 7,783,390 B2 | 8/2010 | Miller |
| 7,785,004 B2 | 8/2010 | Kautz et al. |
| 7,860,495 B2 | 12/2010 | McFarland |
| 8,010,815 B2 | 8/2011 | Hamilton et al. |
| 8,069,359 B2 | 11/2011 | Tolentino |
| 8,145,361 B2 | 3/2012 | Forbes et al. |
| 8,180,493 B1 * | 5/2012 | Laskow ............ F24F 11/0086 165/201 |
| 8,204,628 B2 | 6/2012 | Schnell et al. |
| 8,204,633 B2 | 6/2012 | Harbin et al. |
| 8,326,466 B2 | 12/2012 | Peterson |
| 8,356,760 B2 | 1/2013 | Riley, Jr. |
| 8,442,695 B2 | 5/2013 | Imes et al. |
| 8,464,086 B2 | 6/2013 | Cepulis |
| 8,843,238 B2 | 9/2014 | Wenzel et al. |
| 2003/0153986 A1 | 8/2003 | Salsbury et al. |
| 2004/0215356 A1 | 10/2004 | Salsbury et al. |
| 2005/0209813 A1 | 9/2005 | Kautz et al. |
| 2008/0277486 A1 | 11/2008 | Seem et al. |
| 2008/0298431 A1 | 12/2008 | Kautz et al. |
| 2010/0187832 A1 | 7/2010 | Holland et al. |
| 2010/0324962 A1 | 12/2010 | Nesler et al. |
| 2011/0047418 A1 | 2/2011 | Drees et al. |
| 2011/0061015 A1 | 3/2011 | Drees et al. |
| 2011/0093133 A1 | 4/2011 | Turney et al. |
| 2011/0130886 A1 | 6/2011 | Drees et al. |
| 2011/0178977 A1 | 7/2011 | Drees |
| 2011/0257911 A1 | 10/2011 | Drees et al. |
| 2012/0022700 A1 | 1/2012 | Drees et al. |
| 2012/0084063 A1 | 4/2012 | Drees et al. |
| 2012/0091804 A1 | 4/2012 | Altonen et al. |
| 2012/0117989 A1 | 5/2012 | Turney et al. |
| 2012/0150707 A1 | 6/2012 | Campbell et al. |
| 2013/0013119 A1 | 1/2013 | Mansfield et al. |
| 2013/0231792 A1 | 9/2013 | Ji et al. |

OTHER PUBLICATIONS

Lee et al., "Model-based demand-limiting control of building thermal mass", Science Direct Building and Environment, vol. 43, Issue 10, Oct. 2008, pp. 1633-1646.

Lee et al., Development of Methods for Determining Demand-Limiting Setpoint Trajectories in Buildings Using Short-Term Measurements, Elsevier Ltd., www.sciencedirect.com, 2008, 14 pages.

Sun et al., "A demand limiting strategy for maximizing monthly cost savings of commercial buildings", Science Direct Energy and Buildings, vol. 42, Issue 11, Nov. 2010, pp. 2219-2230.

Truong et al., "Modelling and short-term forecasting of daily peak power demand in Victoria using two-dimensional wavelet based SOP models", Science Direct International Journal of Electrical Power & Energy Systems, vol. 30, Issue 9, Nov. 2008, pp. 511-518.

Notice of Allowance on U.S. Appl. No. 14/276,745 dated Nov. 12, 2015, 10 pages.

* cited by examiner

SYSTEMS AND METHODS FOR CONTROLLING ENERGY USE DURING A DEMAND LIMITING PERIOD

CROSS-REFERENCE TO RELATED PATENT APPLICATIONS

This application is a continuation of U.S. patent application Ser. No. 13/251,134 filed Sep. 30, 2011, the entire disclosure of which is incorporated by reference herein.

GOVERNMENT LICENSE RIGHTS

This invention was made with government support under DE-EE0003982 awarded by the Department of Energy. The government has certain rights in the invention.

BACKGROUND

The present invention relates generally to the field of building management systems. The present invention more particularly relates to systems and methods for integrating a building management system with smart grid components and data.

In a smart grid, the switching points in the grid, as well as several other points distributed throughout the grid, include microprocessor driven controls configured to automatically reconfigure the circuits and communicate bi-directional information. The communicated information can be carried over the power distribution grid itself or other communication mediums (e.g., wireless, optical, wired, etc.).

A smart grid is a key element of a comprehensive strategy to increase energy reliability and efficiency, reduce energy costs, and lower greenhouse gas emissions. The large portion of smart grid R&D efforts today are focused on creating the digital communications architecture and distribution management infrastructure connecting power plant and utility-scale energy resources with distributed meters. During peak usage times, demand limiting may be utilized to reduce the energy costs of operating a building's heating, ventilation, and air conditioning (HVAC), lighting, elevator, and other subsystems.

SUMMARY

One embodiment of the invention relates to a method for controlling power consumption by an HVAC system of a building. The method includes using an energy use (e.g., energy consumption, power demand, a blend of energy consumption and power demand) setpoint as a reference input for a feedback controller. The method also includes using a measured energy use as a measured input for the feedback controller. The method further includes using the feedback controller to generate a manipulated variable for adjusting the operation of an HVAC device.

Another embodiment of the present invention relates to a feedback controller for controlling power consumption by an HVAC system of a building. The controller includes a processing circuit configured to generate a manipulated variable for adjusting the operation of an HVAC device. The processing circuit also includes an error analyzer configured to receive an energy use setpoint as a reference input and to receive an energy use as a measured input. The error analyzer is further configured to compare the reference input and the measured input, and to use the comparison to determine an error value. The processing circuit additionally includes an error corrector configured to receive the error value and to use the error value to generate the manipulated variable.

Yet another embodiment of the present invention relates to a method of adjusting an energy use setpoint for controlling power consumption by an HVAC system of a building. The method includes comparing a building temperature measurement from the end of a demand limiting period to a temperature threshold. The method also includes adjusting the energy use setpoint for a second demand limiting period based on the comparison.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

The present invention relates to a building management system configured to improve building efficiency, to enable greater use of renewable energy sources, and to provide more comfortable and productive buildings.

A building management system (BMS) is, in general, hardware and/or software configured to control, monitor, and manage devices in or around a building or building area. BMS subsystems or devices can include heating, ventilation, and air conditioning (HVAC) subsystems or devices, security subsystems or devices, lighting subsystems or devices, fire alerting subsystems or devices, elevator subsystems or devices, other devices that are capable of managing building functions, or any combination thereof.

Figure 1A:
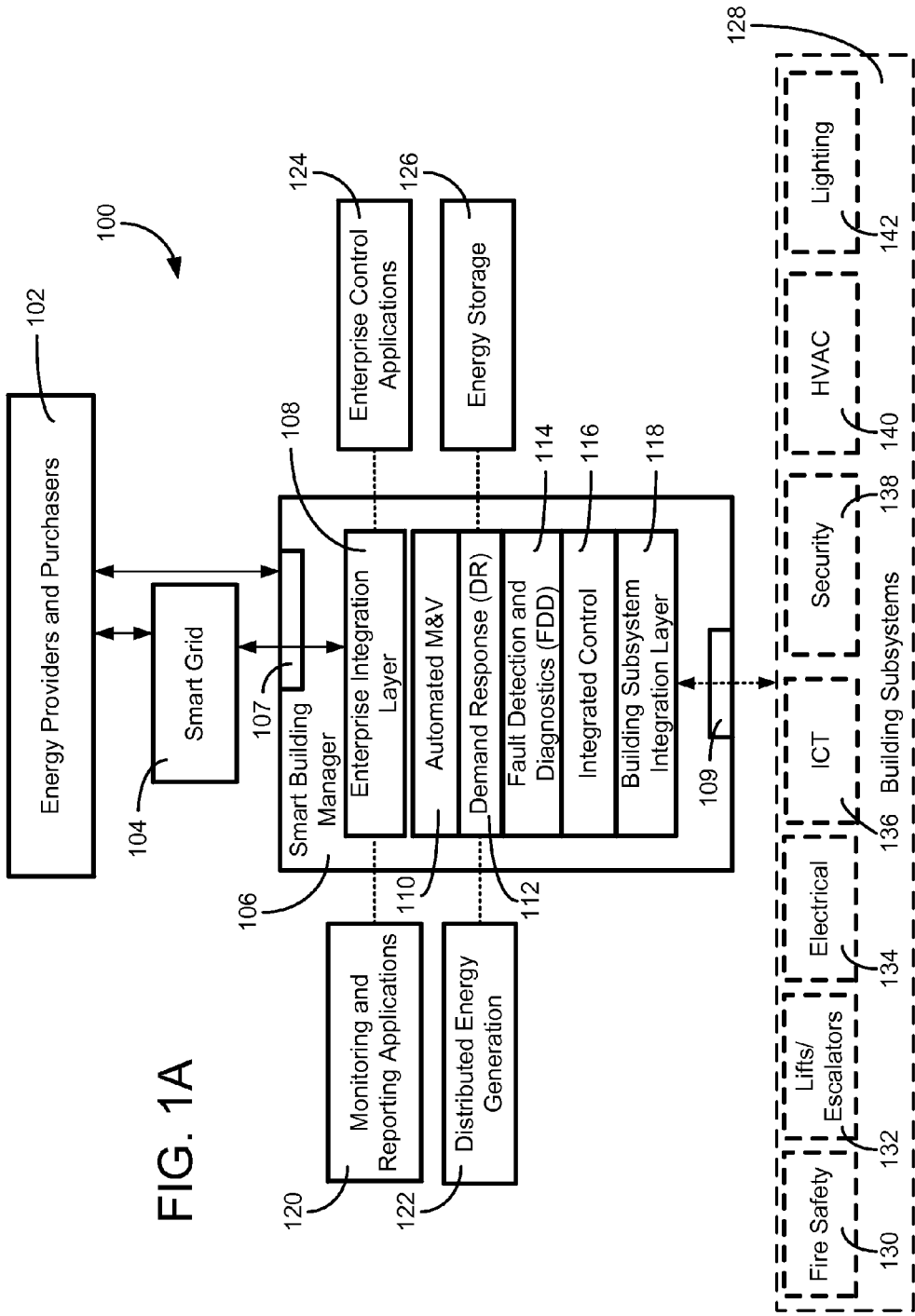
FIG. 1A is a block diagram of a building manager connected to a smart grid and a plurality of building subsystems, according to an exemplary embodiment.

Referring now to FIG. 1A, a block diagram of a system 100 including a smart building manager 106 is shown, according to an exemplary embodiment. Smart building manager 106 is connected to a smart grid 104 and a plurality of building subsystems 128. The building subsystems 128 may include a building electrical subsystem 134, an information communication technology (ICT) subsystem 136, a security subsystem 138, a HVAC subsystem 140, a lighting subsystem 142, a lift/escalators subsystem 132, and a fire safety subsystem 130. The building subsystems 128 can include fewer, additional, or alternative subsystems. For example, building subsystems 128 may also or alternatively include a refrigeration subsystem, an advertising or signage system subsystem, a cooking subsystem, a vending subsystem, or a printer or copy service subsystem. Conventionally these systems are autonomous and managed by separate control systems. Embodiments of the smart building manager described herein are configured to achieve energy consumption and energy demand reductions by integrating the management of the building subsystems.

Each of building subsystems 128 include any number of devices, controllers, and connections for completing their individual functions and control activities. For example, HVAC subsystem 140 may include a chiller, a boiler, any number of air handling units, economizers, field controllers, supervisory controllers, actuators, temperature sensors, or other devices for controlling the temperature within a building. As another example, lighting subsystem 142 may include any number of light fixtures, ballasts, lighting sensors, dimmers, or other devices configured to controllably adjust the amount of light provided to a building space. Security subsystem 138 may include occupancy sensors, video surveillance cameras, digital video recorders, video processing servers, intrusion detection devices, access control devices and servers, or other security-related devices.

In an exemplary embodiment, the smart building manager 106 is configured to include: a communications interface 107 to the smart grid 104 outside the building, an interface 109 to disparate subsystems 128 within a building (e.g., HVAC, lighting security, lifts, power distribution, business, etc.), and an interface to applications 120, 124 (network or local) for allowing user control, and the monitoring and adjustment of the smart building manager 106 or subsystems 128. Enterprise control applications 124 may be configured to provide subsystem-spanning control to a graphical user interface (GUI) or to any number of enterprise-level business applications (e.g., accounting systems, user identification systems, etc.). Enterprise control applications 124 may also or alternatively be configured to provide configuration GUIs for configuring the smart building manager 106. In yet other embodiments enterprise control applications 124 can work with layers 110-118 to optimize building performance (e.g., efficiency, energy use, comfort, or safety) based on inputs received at the interface 107 to the smart grid and the interface 109 to building subsystems 128. In an exemplary embodiment smart building manager 106 is integrated within a single computer (e.g., one server, one housing, etc.). In various other exemplary embodiments the smart building manager 106 can be distributed across multiple servers or computers (e.g., that can exist in distributed locations).

Figure 1B:
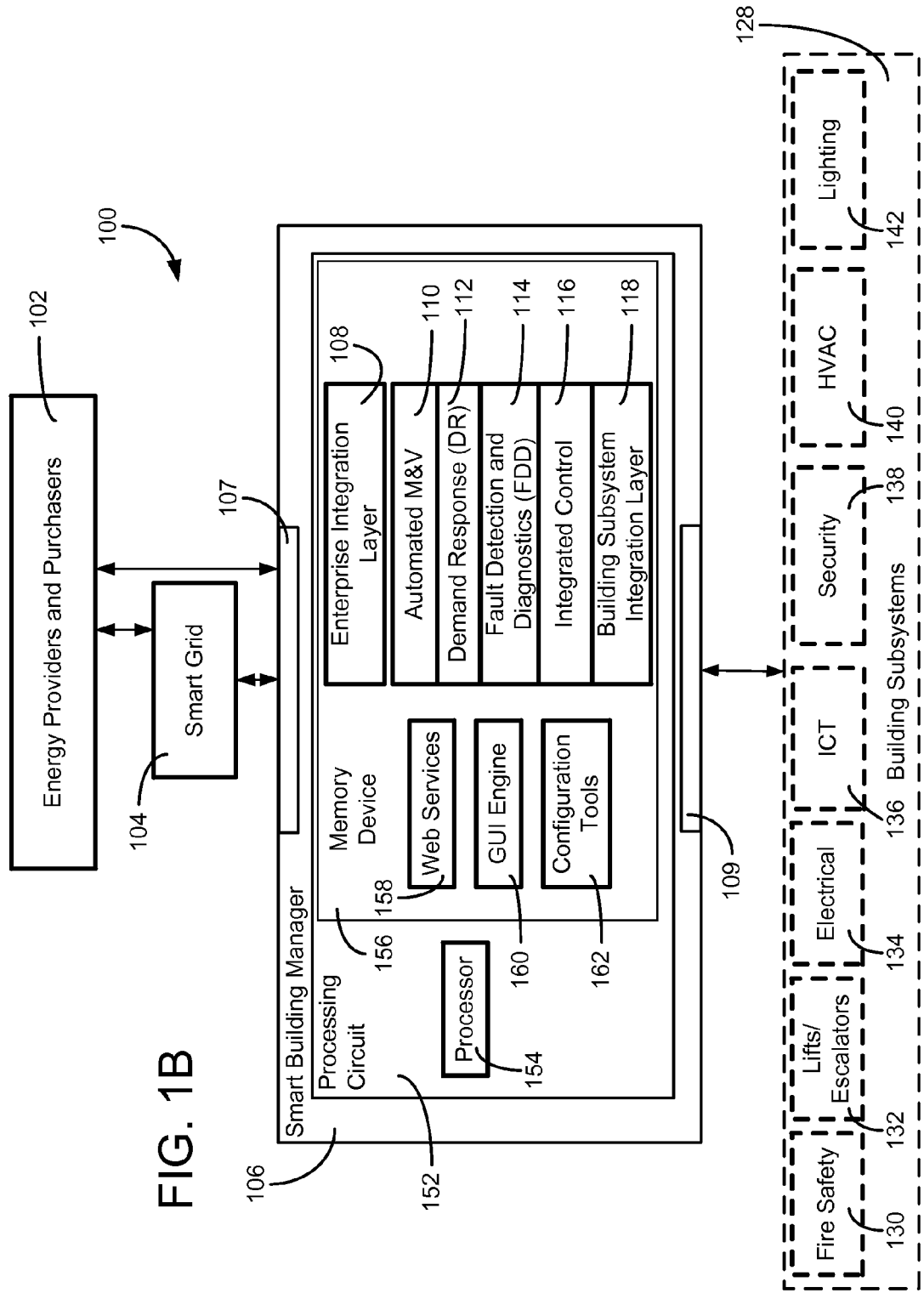
FIG. 1B is a more detailed block diagram of the building manager shown in FIG. 1A, according to an exemplary embodiment.

FIG. 1B illustrates a more detailed view of smart building manager 106, according to an exemplary embodiment. In particular, FIG. 1B illustrates smart building manager 106 as having a processing circuit 152. Processing circuit 152 is shown to include a processor 154 and memory device 156. Processor 154 can be implemented as a general purpose processor, an application specific integrated circuit (ASIC), one or more field programmable gate arrays (FPGAs), a group of processing components, or other suitable electronic processing components. Memory device 156 (e.g., memory, memory unit, storage device, etc.) is one or more devices (e.g., RAM, ROM, Flash memory, hard disk storage, etc.) for storing data and/or computer code for completing and/or facilitating the various processes, layers and modules described in the present application. Memory device 156 may be or include volatile memory or non-volatile memory. Memory device 156 may include database components, object code components, script components, or any other type of information structure for supporting the various activities and information structures described in the present application. According to an exemplary embodiment, memory device 156 is communicably connected to processor 154 via processing circuit 152 and includes computer code for executing (e.g., by processing circuit 152 and/or processor 154) one or more processes described herein.

Communications interfaces 107, 109 can be or include wired or wireless interfaces (e.g., jacks, antennas, transmitters, receivers, transceivers, wire terminals, etc.) for conducting data communications with, e.g., smart grid 104, energy providers and purchasers 102, building subsystems 128, or other external sources via a direct connection or a network connection (e.g., an Internet connection, a LAN, WAN, or WLAN connection, etc.). For example, communications interfaces 107, 109 can include an Ethernet card and port for sending and receiving data via an Ethernet-based communications link or network. In another example, communications interfaces 107, 109 can include a WiFi transceiver for communicating via a wireless communications network. In another example, one or both of interfaces 107, 109 may include cellular or mobile phone communications transceivers. In one embodiment communications interface 107 is a power line communications interface and communications interface 109 is an Ethernet interface. In other embodiments, both communications interface 107 and communications interface 109 are Ethernet interfaces or are the same Ethernet interface. Further, while FIG. 1A shows applications 120 and 124 as existing outside of smart building manager 106, in some embodiments applications 120 and 124 may be hosted within smart building manager 106 generally or memory device 156 more particularly.

Building Subsystem Integration Layer

Referring further to FIG. 1B, the building subsystem integration layer 118 is configured to manage communications between the rest of the smart building manager 106's components and the building subsystems. The building subsystem integration layer 118 may also be configured to manage communications between building subsystems. The building subsystem integration layer 118 may be configured to translate communications (e.g., sensor data, input signals, output signals, etc.) across a plurality of multi-vendor/multi-protocol systems. For example, the building subsystem integration layer 118 may be configured to integrate data from subsystems 128.

Figure 2:
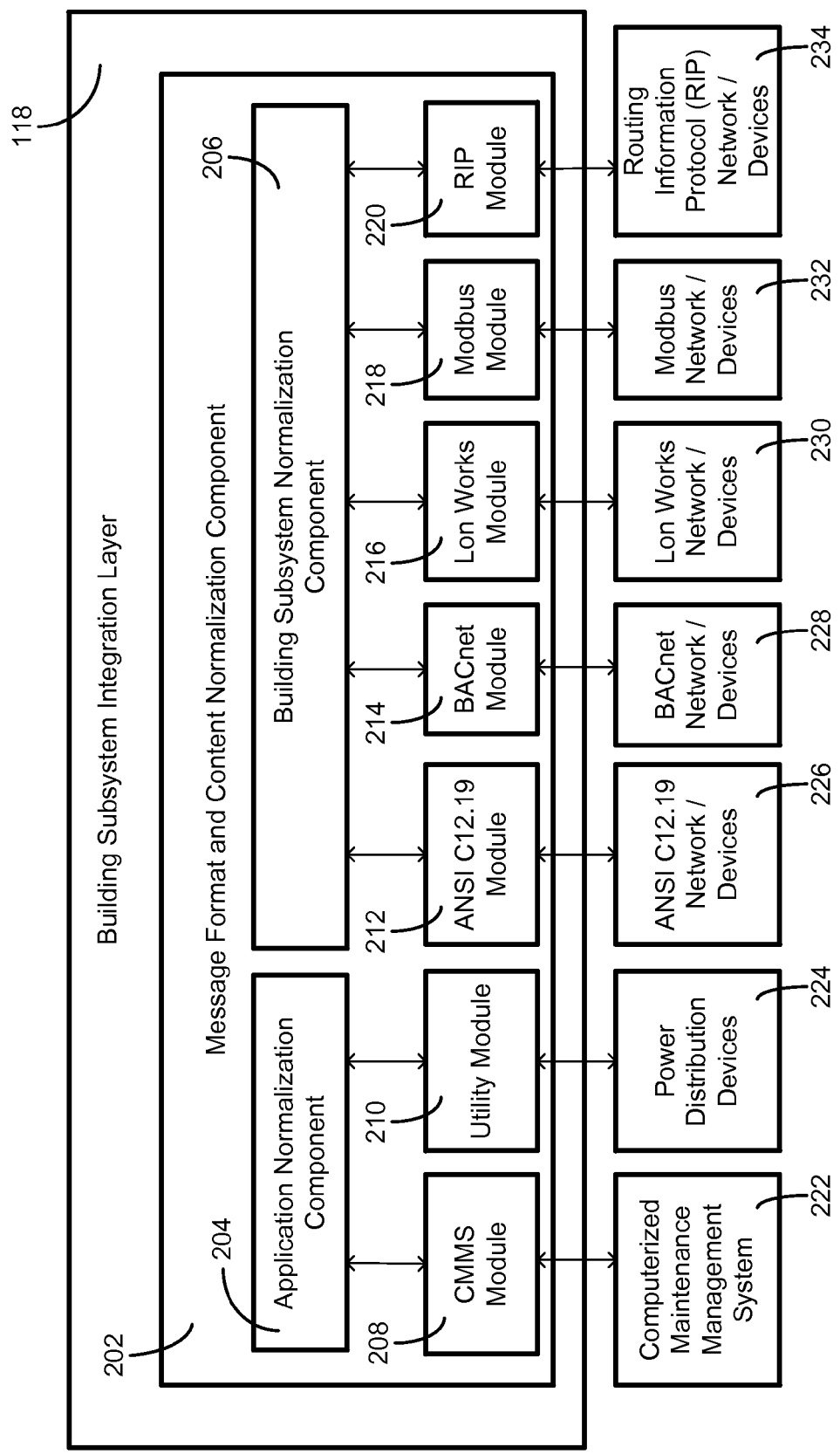
FIG. 2 is a block diagram of the building subsystem integration layer shown in FIG. 1A, according to an exemplary embodiment.

In FIG. 2, the building subsystem integration layer 118 is shown in greater detail to include a message format and content normalization component 202. The message format and content normalization component 202 is configured to convert data messages for and from disparately protocolled devices or networks (e.g., different building subsystems, differently protocolled smart-grid sources, etc.). The message format and content normalization component 202 is shown to include two subcomponents, an application normalization component 204 and a building subsystem normalization component 206. The application normalization component 204 is a computer function, object, service, or combination thereof configured to drive the conversion of communications for and from applications (e.g., enterprise level applications 120, 124 shown in FIG. 1A, a computerized maintenance management system 222, utility company applications via smart grid 104 shown in FIG. 1A, etc.). The building subsystem normalization component 206 is a computer function, object, service, or combination thereof configured to drive the conversion of communications for and from building subsystems (e.g., building subsystems 128 shown in FIG. 1A, building subsystem controllers, building devices, security systems, fire systems, etc.). The application normalization component 204 and the building subsystem normalization component 206 are configured to accommodate multiple communications or data protocols. In some embodiments, the application normalization component 204 and the building subsystem normalization component 206 are configured to conduct the conversion for each protocol based on information stored in modules 208-220 (e.g., a table, a script, in memory device 156 shown in FIG. 1B) for each of systems or devices 222-234. The protocol modules 208-220 may be, for example, schema maps or other descriptions of how a message for one protocol should be translated to a message for a second protocol. In some embodiments the modules 208-220 may be "plug-in" drivers that can be easily installed to or removed from a building subsystem integration layer 118 (e.g., via an executable installation routine, by placing a file in an interfaces folder, etc.) during setup. For example, modules 208-220 may be vendor specific (e.g., Johnson Controls, Honeywell, Siemens, etc.), standards-based (e.g., BACnet, ANSI C12.19, Lon Works, Modbus, RIP, SNMP, SOAP, web services, HTML, HTTP/HTTPS, XML, XAML, TFTP, DHCP, DNS, SMTP, SNTP, etc.), user built, user selected, and/or user customized. In some embodiments the application normalization component 204 or building subsystem normalization component 206 are configured for compatibility with new modules or drivers (e.g., user defined or provided by a vendor or third party). In such embodiments, message format and content normalization component 202 may advantageously be scaled for future applications or case-specific requirements (e.g., situations calling for the use of additional cyber security standards such as data encryption/decryption) by changing the active module set or by installing a new module.

Using message format and content normalization component 202, the building subsystem integration layer 118 can be configured to provide a service-oriented architecture for providing cross-subsystem control activities and cross-subsystem applications. The message format and content normalization component 202 can be configured to provide a relatively small number of straightforward interfaces (e.g., application programming interfaces (APIs)) or protocols (e.g., open protocols, unified protocols, common protocols) for use by layers 108-116 (shown in FIG. 1A) or external applications (e.g., 120, 124 shown in FIG. 1A) and to "hide" such layers or applications from the complexities of the underlying subsystems and their particular data transport protocols, data formats, semantics, interaction styles, and the like. Configuration of the message format and content normalization component 202 may occur automatically (e.g., via a building subsystem and device discovery process), via user configuration, or by a combination of automated discovery and user configuration. User configuration may be driven by providing one or more graphical user interfaces or "wizards" to a user, the graphical user interfaces allowing the user to map an attribute from one protocol to an attribute of another protocol. Configuration tool 162 shown in FIG. 1B may be configured to drive such an association process. The configuration tool 162 may be served to clients (local or remote) via web services 158 and/or GUI engine 160 (both shown in FIG. 1B). The configuration tool 162 may be provided as a thin web client (e.g., that primarily interfaces with web services 158) or a thick client (e.g., that only occasionally draws upon web services 158 and/or GUI engine 160). Configuration tool 162 may be configured to use a W3C standard intended to harmonize semantic information from different systems to controllably define, describe and store relationships between the data/protocols (e.g., define the modules 208-220). For example, the W3C standard used may be the Web Ontology Language (OWL). In some exemplary embodiments, configuration tool 162 may be configured to prepare the message format and content normalization component 202 (and device/protocol modules 208-220 thereof) for machine level interoperability of data content.

Once the building subsystem integration layer 118 is configured, developers of applications may be provided with a software development kit to allow rapid development of applications compatible with the smart building manager (e.g., with an application-facing protocol or API of the building subsystem integration layer). Such an API or application-facing protocol may be exposed at the enterprise integration layer 108 shown in FIGS. 1A and 1B. In various exemplary embodiments, the smart building manager 106 including building subsystem integration layer 118 includes the following features or advantages: seamless in that heterogeneous applications and subsystems may be integrated without varying or affecting the behavior of the external facing interfaces or logic; open in that it allows venders to develop products and applications by coding adapters (e.g. modules 208-220 shown in FIG. 2) or features according to a well-defined specification; multi-standard in that it supports subsystems that operate according to standards as well as proprietary protocols; extensible in that it accommodates new applications and subsystems with little to no modification; scalable in that it supports many applications and subsystems, adaptable in that it allows for the addition or deletion of applications or subsystems without affecting system consistency; user-configurable in that it is adjustable to changes in the business environment, business rules, or business workflows; and secure in that it protects information transferred through the integration channel. Additional details with respect to building subsystem integration layer 118 are described below with respect to FIG. 3.

Integrated Control Layer

Referring further to FIGS. 1A and 1B, the integrated control layer 116 is configured to use the data input and/or output of the building subsystem integration layer 118 to make control decisions. Due to the subsystem integration provided by the building subsystem integration layer 118, the integrated control layer 116 can integrate control activities of the subsystems 128 such that the subsystems 128 behave as a single integrated supersystem. In an exemplary embodiment the integrated control layer 116 includes control logic that uses inputs and outputs from a plurality of building subsystems to provide greater comfort and energy savings relative to the comfort and energy savings that separate subsystems could provide alone. For example, information from a first building subsystem may be used to control a second building subsystem. By way of a more particular example, when a building employee badges in at a parking garage, a message may be sent from the parking subsystem to the building subsystem integration layer 118, converted into an event recognized as a universal occupancy (e.g., "badge-in") event and provided to integrated control layer 116. Integrated control layer 116 may include logic that turns on the lights in the building employee's office, begins cooling the building employee's office in response to the anticipated occupancy, and boots up the employee's computer. The decision to turn the devices on is made by integrated control layer 116 and integrated control layer 116 may cause proper "on" commands to be forwarded to the particular subsystems (e.g., the lighting subsystem, the IT subsystem, the HVAC subsystem). The integrated control layer 116 passes the "on" commands through building subsystem integration layer 118 so that the messages are properly formatted or protocolled for receipt and action by the subsystems. As is illustrated in FIGS. 1A-B, the integrated control layer 116 is logically above the building subsystems and building subsystem controllers. The integrated control layer 116, by having access to information from multiple systems, is configured to use inputs from one or more building subsystems 128 to make control decisions for control algorithms of other building subsystems. For example, the "badge-in" event described above can be used by the integrated control layer 116 (e.g., a control algorithm thereof) to provide new setpoints to an HVAC control algorithm of the HVAC subsystem.

While conventional building subsystem controllers are only able to process inputs that are directly relevant to the performance of their own control loops, the integrated control layer 116 is configured to use an input from a first subsystem to make an energy-saving control decision for a second subsystem. Results of these decisions can be communicated back to the building subsystem integration layer 116 via, for example, the message format and content normalization component 202 shown in FIG. 2A. Therefore, advantageously, regardless of the particular HVAC system or systems connected to the smart building manager, and due to the normalization at the building subsystem integration layer 118, the integrated control layer's control algorithms can determine a control strategy using normalized temperature inputs, and provide an output including a normalized setpoint temperature to the building subsystem integration layer. The building subsystem integration layer 118 can translate the normalized setpoint temperature into a command specific to the building subsystem or controller for which the setpoint adjustment is intended. If multiple subsystems are utilized to complete the same function (e.g., if multiple disparately protocolled HVAC subsystems are provided in different regions of a building), the building subsystem integration layer 118 can convert a command decision (e.g., to lower the temperature setpoint by 2 degrees) to multiple different commands for receipt and action by the multiple disparately protocolled HVAC subsystems. In this way, functions of the integrated control layer 116 may be executed using the capabilities of building subsystem integration layer 118. In an exemplary embodiment, the integrated control layer is configured to conduct the primary monitoring of system and subsystem statuses and interrelationships for the building. Such monitoring can cross the major energy consuming subsystems of a building to allow for cross-subsystem energy savings to be achieved (e.g., by the demand response layer 112).

The integrated control layer 116 is shown to be logically below the demand response layer 112. The integrated control layer 116 is configured to enhance the effectiveness of the demand response layer 112 by enabling building subsystems 128 and their respective control loops to be controlled in coordination with the demand response layer 112. This configuration may advantageously provide much less disruptive demand response behavior than conventional systems. For example, the integrated control layer 116 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller. The integrated control layer 116 may also be configured to provide feedback to the demand response layer 112 so that the demand response layer 112 may check that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. The integrated control layer 116 is also logically below the fault detection and diagnostics (FDD) layer 114 and the automated measurement and validation layer 110. The integrated control layer may be configured to provide calculated inputs (e.g., aggregations) to these "higher levels" based on outputs from more than one building subsystem.

Control activities that may be completed by the integrated control layer 116 (e.g., software modules or control algorithms thereof) include occupancy-based control activities. Security systems such as radio frequency location systems (RFLS), access control systems, and video surveillance systems can provide detailed occupancy information to the integrated control layer 116 and other building subsystems 128 via the smart building manager 106 (and more particularly, via the building subsystem integration layer 118). Integration of an access control subsystem and a security subsystem for a building may provide detailed occupancy data for consumption by the integrated control layer 116 (e.g., beyond binary "occupied" or "unoccupied" data available to some conventional HVAC systems that rely on, for example, a motion sensor). For example, the exact number of occupants in the building (or building zone, floor, conference room, etc.) may be provided to the integrated control layer 116 or aggregated by the integrated control layer 116 using inputs from a plurality of subsystems. The exact number of occupants in the building can be used by the integrated control layer 116 to determine and command appropriate adjustments for building subsystems 128 (such as HVAC subsystem 140 or lighting subsystem 142). Integrated control layer 116 may be configured to use the number of occupants, for example, to determine how many of the available elevators to activate in a building. If the building is only 20% occupied, the integrated control layer 116, for example, may be configured to power down 80% of the available elevators for energy savings. Further, occupancy data may be associated with individual workspaces (e.g., cubicles, offices, desks, workstations, etc.) and if a workspace is determined to be unoccupied by the integrated control layer, a control algorithm of the integrated control layer 116 may allow for the energy using devices serving the workspace to be turned off or commanded to enter a low power mode. For example, workspace plug-loads, task lighting, computers, and even phone circuits may be affected based on a determination by the integrated control layer that the employee associated with the workspace is on vacation (e.g., using data inputs received from a human-resources subsystem). Significant electrical loads may be shed by the integrated control layer 116, including, for example, heating and humidification loads, cooling and dehumidification loads, ventilation and fan loads, electric lighting and plug loads (e.g. with secondary thermal loads), electric elevator loads, and the like. The integrated control layer 116 may further be configured to integrate an HVAC subsystem or a lighting subsystem with sunlight shading devices or other "smart window" technologies. Natural day-lighting can significantly offset lighting loads but for optimal comfort may be controlled by the integrated control layer to prevent glare or over-lighting. Conversely, shading devices and smart windows may also be controlled by the integrated control layer 116 to calculably reduce solar heat gains in a building space—which can have a significant impact on cooling loads. Using feedback from sensors in the space, and with knowledge of the HVAC control strategy, the integrated control layer 116 may further be configured to control the transmission of infrared radiation into the building, minimizing thermal transmission when the HVAC subsystem is cooling and maximizing thermal transmission when the HVAC subsystem is heating. As a further example of an occupancy-based control strategy that may be implemented by the integrated control layer 116, inputs from a video security subsystem may be analyzed by a control algorithm of the integrated control layer 116 to make a determination regarding occupancy of a building space. Using the determination, the control algorithm may turn off the lights, adjust HVAC set points, power-down ICT devices serving the space, reduce ventilation, and the like—enabling energy savings with an acceptable loss of comfort to occupants of the building space.

Figure 3:
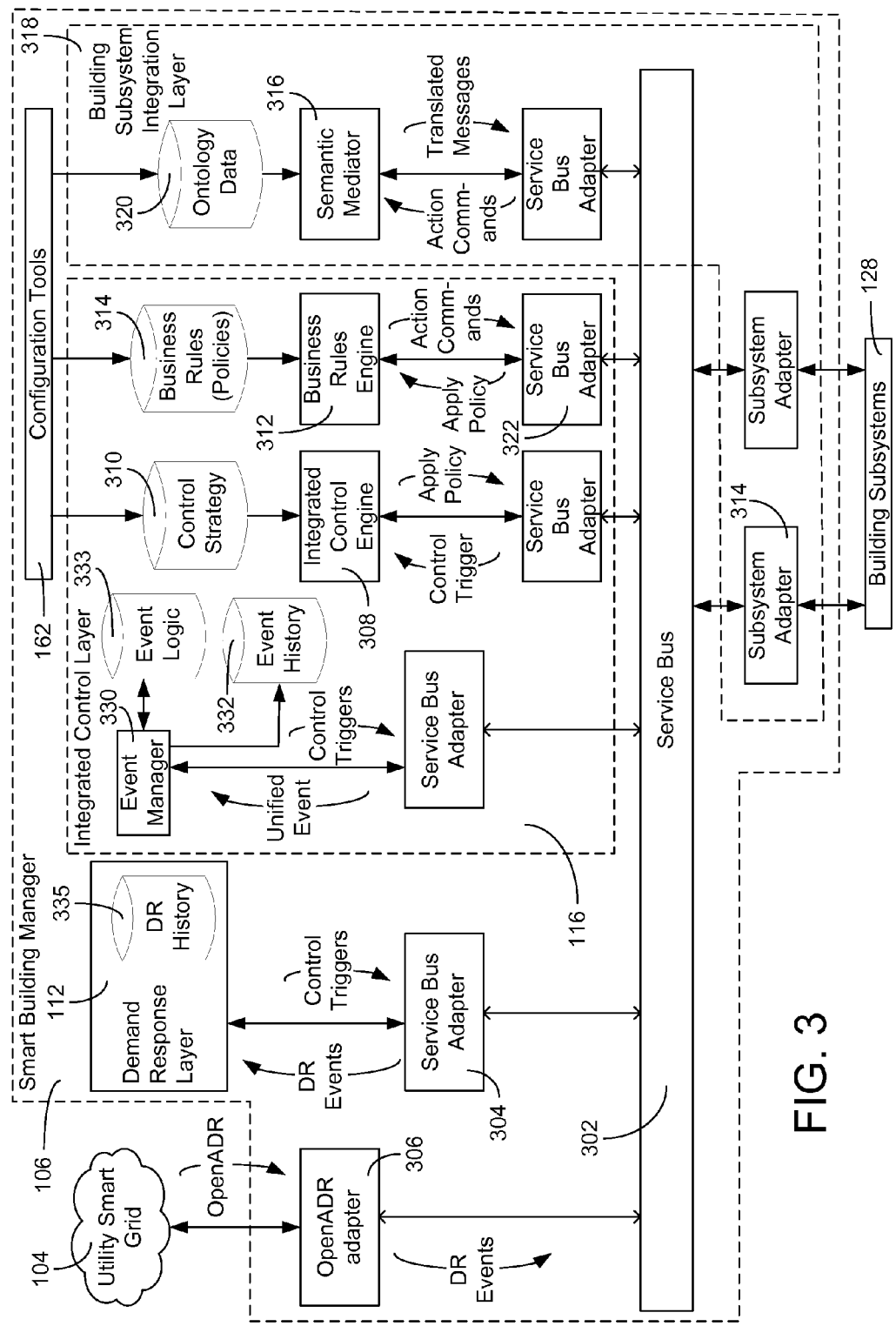
FIG. 3 is a detailed diagram of a portion of a smart building manager as shown in FIGS. 1A and 1B, according to an exemplary embodiment.

Referring now to FIG. 3, a detailed diagram of a portion of smart building manager 106 is shown, according to an exemplary embodiment. In particular, FIG. 3 illustrates a detailed embodiment of integrated control layer 116. Configuration tools 162 can allow a user to define (e.g., via graphical user interfaces, via prompt-driven "wizards", etc.) how the integrated control layer 116 should react to changing conditions in the building subsystems 128. In an exemplary embodiment configuration tools 162 allow a user to build and store condition-response scenarios that can cross multiple building subsystems and multiple enterprise control applications (e.g., work order management system applications, entity resource planning (ERP) applications, etc.).

Building subsystems 128, external sources such as smart grid 104, and internal layers such as demand response layer 112 can regularly generate events (e.g., messages, alarms, changed values, etc.) and provide the events to integrated control layer 116 or another layer configured to handle the particular event. For example, demand response (DR) events (e.g., a change in real time energy pricing) may be provided to smart building manager 106 as Open Automated Demand Response ("OpenADR") messages (a protocol developed by Lawrence Berkeley National Laboratories). The DR messages may be received by OpenADR adapter 306 (which may be a part of enterprise application layer 108 shown in FIGS. 1A and 1B). The OpenADR adapter 306 may be configured to convert the OpenADR message into a DR event configured to be understood (e.g., parsed, interpreted, processed, etc.) by demand response layer 112. The DR event may be formatted and transmitted according to or via a service bus 302 for the smart building manager 106.

Service bus adapter 304 may be configured to "trap" or otherwise receive the DR event on the service bus 302 and forward the DR event on to demand response layer 112. Service bus adapter 304 may be configured to queue, mediate, or otherwise manage demand response messages for demand response layer 112. Once a DR event is received by demand response layer 112, logic thereof can generate a control trigger in response to processing the DR event. The integrated control engine 308 of integrated control layer 116 is configured to parse the received control trigger to determine if a control strategy exists in control strategy database 310 that corresponds to the received control trigger. If a control strategy exists, integrated control engine 308 executes the stored control strategy for the control trigger. In some cases the output of the integrated control engine 308 will be an "apply policy" message for business rules engine 312 to process. Business rules engine 312 may process an "apply policy" message by looking up the policy in business rules database 314. A policy in business rules database 314 may take the form of a set of action commands for sending to building subsystems 128. The set of action commands may include ordering or scripting for conducting the action commands at the correct timing, ordering, or with other particular parameters. When business rules engine 312 processes the set of action commands, therefore, it can control the ordering, scripting, and other parameters of action commands transmitted to the building subsystems 128.

Action commands may be commands for relatively direct consumption by building subsystems 128, commands for other applications to process, or relatively abstract cross-subsystem commands. Commands for relatively direct consumption by building subsystems 128 can be passed through service bus adapter 322 to service bus 302 and to a subsystem adapter 314 for providing to a building subsystem in a format particular to the building subsystem. Commands for other applications to process may include commands for a user interface application to request feedback from a user, a command to generate a work order via a computerized maintenance management system (CMMS) application, a command to generate a change in an ERP application, or other application level commands.

More abstract cross-subsystem commands may be passed to a semantic mediator 316 which performs the task of translating those actions to the specific commands required by the various building subsystems 128. For example, a policy might contain an abstract action to "set lighting zone X to maximum light." The semantic mediator 316 may translate this action to a first command such as "set level to 100% for lighting object O in controller C" and a second command of "set lights to on in controller Z, zone_id_no 3141593." In this example both lighting object O in controller C and zone_id_no 3141593 in controller Z may affect lighting in zone X. Controller C may be a dimming controller for accent lighting while controller Z may be a non-dimming controller for the primary lighting in the room. The semantic mediator 316 is configured to determine the controllers that relate to zone X using ontology database 320. Ontology database 320 stores a representation or representations of relationships (the ontology) between building spaces and subsystem elements and subsystems elements and concepts of the integrated building supersystem. Using the ontology stored in ontology database 320, the semantic mediator can also determine that controller C is dimming and requires a numerical percentage parameter while controller Z is not dimming and requires only an on or off command. Configuration tool 162 can allow a user to build the ontology of ontology database 320 by establishing relationships between subsystems, building spaces, input/output points, or other concepts/objects of the building subsystems and the building space.

Events other than those received via OpenADR adapter 306, demand response layer 112, or any other specific event-handing mechanism can be trapped by subsystem adapter 314 (a part of building integration subsystem layer 318) and provided to a general event manager 330 via service bus 302 and a service bus adapter. By the time an event from a building subsystem 128 is received by event manager 330, it may have been converted into a unified event (i.e., "common event," "standardized event", etc.) by subsystem adapter 314 and/or other components of building subsystem integration layer 318 such as semantic mediator 316. The event manager 330 can utilize an event logic DB to lookup control triggers, control trigger scripts, or control trigger sequences based on received unified events. Event manager 330 can provide control triggers to integrated control engine 308 as described above with respect to demand response layer 112. As events are received they may be archived in event history 332 by event manager 330. Similarly, demand response layer 112 can store DR events in DR history 335. One or both of event manager 330 and demand response layer 112 may be configured to wait until multi-event conditions are met (e.g., by processing data in history as new events are received). For example, demand response layer 112 may include logic that does not act to reduce energy loads until a series of two sequential energy price increases are received. In an exemplary embodiment event manager 330 may be configured to receive time events (e.g., from a calendaring system). Different time events can be associated with different triggers in event logic database 333.

In an exemplary embodiment the configuration tools 162 can be used to build event conditions or trigger conditions in event logic 333 or control strategy database 310. For example, the configuration tools 162 can provide the user with the ability to combine data (e.g., from subsystems, from event histories) using a variety of conditional logic. In varying exemplary embodiments the conditional logic can range from simple logical operators between conditions (e.g., AND, OR, XOR, etc.) to pseudo-code constructs or complex programming language functions (allowing for more complex interactions, conditional statements, loops, etc.). The configuration tools 162 can present user interfaces for building such conditional logic. The user interfaces may allow users to define policies and responses graphically. In some embodiments the user interfaces may allow a user to select a pre-stored or pre-constructed policy and adapt it or enable it for use with their system.

Referring still to FIG. 3, in some embodiments integrated control layer 116 generally and integrated control engine 308 can operate as a "service" that can be used by higher level layers of smart building manager 106, enterprise applications, or subsystem logic whenever a policy or sequence of actions based on the occurrence of a condition is to be performed. In such embodiments control operations do not need to be reprogrammed—applications or logic can rely on the integrated control layer 116 to receive an event and to execute the related subsystem functions. For example, demand response layer 112, fault detection and diagnostics layer 114 (shown in FIGS. 1A and 1B), enterprise integration 108, and applications 120, 124 may all utilize a shared control strategy 310 and integrated control engine 308 in initiate response sequences to events.

Demand Response Layer

FIGS. 1A and 1B are further shown to include a demand response (DR) layer 112. The DR layer 112 is configured to optimize electrical demand in response to time-of-use prices, curtailment signals, or energy availability. Data regarding time-of-use prices, energy availability, and curtailment signals may be received from the smart grid 104, from energy providers and purchasers 102 (e.g., an energy aggregator) via the smart grid 104, from energy providers and purchasers 102 via a communication network apart from the smart grid, from distributed energy generation systems 122, from energy storage banks 126, or from other sources. According to an exemplary embodiment, the DR layer 112 includes control logic for responding to the data and signals it receives. These responses can include communicating with the control algorithms in the integrated control layer 116 to "load shed," changing control strategies, changing setpoints, or shutting down building devices or subsystems in a controlled manner. The architecture and process for supporting DR events is shown in and described with reference to FIG. 3. The DR layer 112 may also include control logic configured to determine when to utilize stored energy based on information from the smart grid and information from a local or remote energy storage system. For example, when the DR layer 112 receives a message indicating rising energy prices during a future "peak use" hour, the DR layer 112 can decide to begin using power from the energy storage system just prior to the beginning of the "peak use" hour.

In some exemplary embodiments the DR layer 112 may include a control module configured to actively initiate control actions (e.g., automatically changing setpoints) which minimize energy costs based on one or more inputs representative of or based on demand (e.g., price, a curtailment signal, a demand level, etc.). The DR layer 112 may further include or draw upon one or more DR policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the DR policy definitions can specify which equipment may be turned on or off in response to particular demand inputs, how long a system or piece of equipment should be turned off, what setpoints can be changed, what the allowable set point adjustment range is, how long to hold a "high demand" setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.). One or more of the policies and control activities may be located within control strategy database 310 or business rules database 314. Further, as described above with reference to FIG. 3, some of the DR responses to events may be processed and completed by integrated control layer 116 with or without further inputs or processing by DR layer 112.

A plurality of market-based DR inputs and reliability based DR inputs may be configured (e.g., via the DR policy definitions or other system configuration mechanisms) for use by the DR layer 112. The smart building manager 106 may be configured (e.g., self-configured, manually configured, configured via DR policy definitions, etc.) to select, deselect or differently weigh varying inputs in the DR layer's calculation or execution of control strategies based on the inputs. DR layer 112 may automatically (and/or via the user configuration) calculate outputs or control strategies based on a balance of minimizing energy cost and maximizing comfort. Such balance may be adjusted (e.g., graphically, via rule sliders, etc.) by users of the smart building manager via a configuration utility or administration GUI.

The DR layer 112 may be configured to receive inputs from other layers (e.g., the building subsystem integration layer, the integrated control layer, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like from inside the system, from the smart grid 104, or from other remote sources.

Some embodiments of the DR layer 112 may utilize industry standard "open" protocols or emerging National Institute of Standards and Technology (NIST) standards to receive real-time pricing (RTP) or curtailment signals from utilities or power retailers. In other embodiments, proprietary protocols or other standards may be utilized. As mentioned above, in some exemplary embodiments, the DR layer 112 is configured to use the OpenADR protocol to receive curtailment signals or RTP data from utilities, other independent system operators (ISOs), or other smart grid sources. The DR layer 112, or another layer (e.g., the enterprise integration layer) that serves the DR layer 112 may be configured to use one or more security schemes or standards such as the Organization for the Advancement of Structured Information Standards (OASIS) Web Service Security Standards to provide for secure communications to/from the DR layer 112 and the smart grid 104 (e.g., a utility company's data communications network). If the utility does not use a standard protocol (e.g., the OpenADR protocol), the DR layer 112, the enterprise integration layer 108, or the building subsystem integration layer 118 may be configured to translate the utility's protocol into a format for use by the utility. The DR layer 112 may be configured to bi-directionally communicate with the smart grid 104 or energy providers and purchasers 102 (e.g., a utility, an energy retailer, a group of utilities, an energy broker, etc.) to exchange price information, demand information, curtailable load calculations (e.g., the amount of load calculated by the DR layer to be able to be shed without exceeding parameters defined by the system or user), load profile forecasts, and the like. DR layer 112 or an enterprise application 120, 124 in communication with the DR layer 112 may be configured to continuously monitor pricing data provided by utilities/ISOs across the nation, to parse the useful information from the monitored data, and to display the useful information to a user to or send the information to other systems or layers (e.g., integrated control layer 116).

The DR layer 112 may be configured to include one or more adjustable control algorithms in addition to or as an alternative from allowing the user creation of DR profiles. For example, one or more control algorithms may be automatically adjusted by the DR layer 112 using dynamic programming or model predictive control modules. In one embodiment business rules engine 312 is configured to respond to a DR event by adjusting a control algorithm or selecting a different control algorithm to use (e.g., for a lighting system, for an HVAC system, for a combination of multiple building subsystems, etc.).

The smart building manager 106 (e.g., using the demand response layer 112) can be configured to automatically (or with the help of a user) manage energy spend. The smart building manager 106 (with input from the user or operating using pre-configured business rules shown in FIG. 3) may be configured to accept time-of-use pricing signals or information from a smart grid (e.g., an energy provider, a smart meter, etc.) and, using its knowledge of historical building system data, control algorithms, calendar information, and/or weather information received from a remote source, may be configured to conduct automatic cost forecasting. The smart building manager 106 (e.g., the demand response layer 112) may automatically (or with user approval) take specific load shedding actions or control algorithm changes in response to different cost forecasts.

The smart building manager 106 may also be configured to monitor and control energy storage systems 126 (e.g., thermal, electrical, etc.) and distributed generation systems 122 (e.g., a solar array for the building, etc.). The smart building manager 106 or DR layer 112 may also be configured to model utility rates to make decisions for the system. All of the aforementioned processing activities or inputs may be used by the smart building manager 106 (and more particularly, a demand response layer 112 thereof) to limit, cap, profit-from, or otherwise manage the building or campus's energy spend. For example, using time-of-use pricing information for an upcoming hour that indicates an unusually high price per kilowatt hour, the system may use its control of a plurality of building systems to limit cost without too drastically impacting occupant comfort. To make such a decision and to conduct such activity, the smart building manager 106 may use data such as a relatively high load forecast for a building and information that energy storage levels or distributed energy levels are low. The smart building manager 106 may accordingly adjust or select a control strategy to reduce ventilation levels provided to unoccupied areas, reduce server load, raise a cooling setpoint throughout the building, reserve stored power for use during the expensive period of time, dim lights in occupied areas, turn off lights in unoccupied areas, and the like.

The smart building manager 106 may provide yet other services to improve building or grid performance. For example, the smart building manager 106 may provide for expanded user-driven load control (allowing a building manager to shed loads at a high level of system/device granularity). The smart building manager 106 may also monitor and control power switching equipment to route power to/from the most efficient sources or destinations. The smart building manager 106 may communicate to the power switching equipment within the building or campus to conduct "smart" voltage regulation. For example, in the event of a brownout, the smart building manager 106 may prioritize branches of a building's internal power grid—tightly regulating and ensuring voltage to high priority equipment (e.g., communications equipment, data center equipment, cooling equipment for a clean room or chemical factory, etc.) while allowing voltage to lower priority equipment to dip or be cut off by the smart grid (e.g., the power provider). The smart building manager 106 or the DR layer 112 may plan these activities or proactively begin load shedding based on grid services capacity forecasting conducted by a source on the smart grid or by a local algorithm (e.g., an algorithm of the demand response layer). The smart building manager 106 or the DR layer 112 may further include control logic for purchasing energy, selling energy, or otherwise participating in a real-time or near real-time energy market or auction. For example, if energy is predicted to be expensive during a time when the DR layer 112 determines it can shed extra load or perhaps even enter a net-positive energy state using energy generated by solar arrays, or other energy sources of the building or campus, the DR layer 112 may offer units of energy during that period for sale back to the smart grid (e.g., directly to the utility, to another purchaser, in exchange for carbon credits, etc.).

In some exemplary embodiments, the DR layer 112 may also be configured to support a "Grid Aware" plug-in hybrid electric vehicle (PHEV)/electric vehicle charging system instead of (or in addition to) having the charging system in the vehicles be grid-aware. For example, in buildings that have vehicle charging stations (e.g., terminals in a parking lot for charging an electric or hybrid vehicle), the DR layer 112 can decide when to charge the vehicles (e.g., when to enable the charging stations, when to switch a relay providing power to the charging stations, etc.) based upon time, real time pricing (RTP) information from the smart grid, or other pricing, demand, or curtailment information from the smart grid. In other embodiments, each vehicle owner could set a policy that is communicated to the charging station and back to the DR layer 112 via wired or wireless communications that the DR layer 112 could be instructed to follow. The policy information could be provided to the DR layer 112 via an enterprise application 124, a vehicle information system, or a personal portal (e.g., a web site vehicle owners are able to access to input, for example, at what price they would like to enable charging). The DR layer 112 could then activate the PHEV charging station based upon that policy unless a curtailment event is expected (or occurs) or unless the DR layer 112 otherwise determines that charging should not occur (e.g., decides that electrical storage should be conducted instead to help with upcoming anticipated peak demand). When such a decision is made, the DR layer 112 may pre-charge the vehicle or suspend charge to the vehicle (e.g., via a data command to the charging station). Vehicle charging may be restricted or turned off by the smart building manager during periods of high energy use or expensive energy. Further, during such periods, the smart building manager 106 or the DR layer 112 may be configured to cause energy to be drawn from plugged-in connected vehicles to supplement or to provide back-up power to grid energy.

Using the real time (or near real-time) detailed information regarding energy use in the building, the smart building manager 106 may maintain a greenhouse gas inventory, forecast renewable energy use, surpluses, deficits, and generation, and facilitate emission allocation, emission trading, and the like. Due to the detailed and real-time or near real-time nature of such calculations, the smart building manager 106 may include or be coupled to a micro-transaction emission trading platform.

The DR layer 112 may further be configured to facilitate the storage of on-site electrical or thermal storage and to controllably shift electrical loads from peak to off peak times using the stored electrical or thermal storage. The DR layer 112 may be configured to significantly shed loads during peak hours if, for example, high price or contracted curtailment signals are received, using the stored electrical or thermal storage and without significantly affecting building operation or comfort. The DR layer 112 may be configured to use a building pre-cooling algorithm in the night or morning. The DR layer 112 may be configured to rely on calculated thermal storage characteristics for the building in order to reduce peak demand for cooling (e.g., by relying on the pre-cooling). Further, the DR layer 112 may be configured to use inputs such as utility rates, type of cooling equipment, occupancy schedule, building construction, climate conditions, upcoming weather events, and the like to make control decisions (e.g., the extent to which to pre-cool, etc.).

Automated Measurement & Verification Layer

FIGS. 1A and 1B are further shown to include an automated measurement and validation layer 110 configured to evaluate building system (and subsystem) performance. The automated measurement and validation (AM&V) layer 110 may implement various methods or standards of the international performance measurement and validation (IPMVP) protocol. In an exemplary embodiment, the AM&V layer 110 is configured to automatically (e.g., using data aggregated by the AM&V layer 110, integrated control layer 116, building subsystem integration layer 118, FDD layer 114, or otherwise) verify the impact of the integrated control layer 116, the FDD layer 114, the DR layer 112, or other energy-saving strategies of the smart building manager 106. For example, the AM&V layer 110 may be used to validate energy savings obtained by capital intensive retrofit projects that are monitored or managed post retrofit by the smart building manager. The AM&V layer 110 may be configured to calculate, for example, a return on investment date, the money saved using pricing information available from utilities, and the like. The AM&V layer 110 may allow for user selection of the validation method(s) it uses. For example, the AM&V layer 110 may allow for the user to select IPMVP Option C which specifies a method for the direct comparison of monthly or daily energy use from a baseline model to actual data from the post-installation measurement period. IPMVP Option C, for example, may specify for adjustments to be made of the base-year energy model analysis to account for current year over base year changes in energy-governing factors such as weather, metering period, occupancy, or production volumes. The AM&V layer 110 may be configured to track (e.g., using received communications) the inputs for use by such a validation method at regular intervals and may be configured to make adjustments to an "adjusted baseline energy use" model against which to measure savings. The AM&V layer 110 may further allow for manual or automatic non-routine adjustments of factors such as changes to the facility size, building envelope, or major equipment. Algorithms according to IPMVP Option B or Option A may also or alternatively be used or included with the AM&V layer 110. IPMVP Option B and IPMVP Option A involve measuring or calculating energy use of a system in isolation before and after it is retrofitted. Using the building subsystem integration layer (or other layers of the BMS), relevant data may be stored and the AM&V layer 110 may be configured to track the parameters specified by IPMVP Option B or A for the computation of energy savings for a system in isolation (e.g., flow rates, temperatures, power for a chiller, etc.).

The AM&V layer 110 may further be configured to verify that control strategies commanded by, for example, the integrated control layer or the DR layer are working properly. Further, the AM&V layer 110 may be configured to verify that a building has fulfilled curtailment contract obligations. The AM&V layer 110 may further be configured as an independent verification source for the energy supply company (utility). One concern of the utility is that a conventional smart meter may be compromised to report less energy (or energy consumed at the wrong time). The AM&V layer 110 can be used to audit smart meter data (or other data used by the utility) by measuring energy consumption directly from the building subsystems or knowledge of building subsystem usage and comparing the measurement or knowledge to the metered consumption data. If there is a discrepancy, the AM&V layer may be configured to report the discrepancy directly to the utility. Because the AM&V layer may be continuously operational and automated (e.g., not based on a monthly or quarterly calculation), the AM&V layer may be configured to provide verification of impact (e.g., of demand signals) on a granular scale (e.g., hourly, daily, weekly, etc.). For example, the AM&V layer may be configured to support the validation of very short curtailment contracts (e.g., drop× kW/h over 20 minutes starting at 2:00 pm) acted upon by the DR layer 112. The DR layer 112 may track meter data to create a subhourly baseline model against which to measure load reductions. The model may be based on average load during a period of hours prior to the curtailment event, during the five prior uncontrolled days, or as specified by other contract requirements from a utility or curtailment service provider (e.g., broker). The calculations made by the AM&V layer 110 may be based on building system energy models and may be driven by a combination of stipulated and measured input parameters to estimate, calculate, apportion, and/or plan for load reductions resulting from the DR control activities.

The AM&V layer 110 may yet further be configured to calculate energy savings and peak demand reductions in accordance with standards, protocols, or best practices for enterprise accounting and reporting on greenhouse gas (GHG) emissions. An application may access data provided or calculated by the AM&V layer 110 to provide for web-based graphical user interfaces or reports. The data underlying the GUIs or reports may be checked by the AM&V layer 110 according to, for example, the GHG Protocol Corporate Accounting Standard and the GHG Protocol for Project Accounting. The AM&V layer 110 preferably consolidates data from all the potential sources of GHG emissions at a building or campus and calculates carbon credits, energy savings in dollars (or any other currency or unit of measure), makes adjustments to the calculations or outputs based on any numbers of standards or methods, and creates detailed accountings or inventories of GHG emissions or emission reductions for each building. Such calculations and outputs may allow the AM&V layer 110 to communicate with electronic trading platforms, contract partners, or other third parties in real time or near real time to facilitate, for example, carbon offset trading and the like.

The AM&V Layer 110 may be further configured to become a "smart electric meter" a or substitute for conventional electric meters. One reason the adoption rate of the "Smart Electric Grid" has conventionally been low is that the entire stock of installed electric meters needs to be replaced so that the meters will support Real Time Pricing (RTP) of energy and other data communications features. The AM&V layer 110 can collect interval-based electric meter data and store the data within the system. The AM&V layer 110 can also communicate with the utility to retrieve or otherwise receive Real Time Pricing (RTP) signals or other pricing information and associate the prices with the meter data. The utility can query this information from the smart building manager (e.g., the AM&V layer 110, the DR layer 112) at the end of a billing period and charge the customer using a RTP tariff or another mechanism. In this manner, the AM&V layer 110 can be used as a "Smart Electric Meter".

When the AM&V layer 110 is used in conjunction with the DR layer 112, building subsystem integration layer 118, and enterprise integration layer 108, the smart building manager 106 can be configured as an energy service portal (ESP). As an ESP, the smart building manager 106 may communicably or functionally connect the smart grid (e.g., energy supply company, utility, ISO, broker, etc.) network to the metering and energy management devices in a building (e.g., devices built into appliances such as dishwashers or other "smart" appliances). In other words, the smart building manager 106 may be configured to route messages to and from other data-aware (e.g., Real Time Pricing (RTP) aware, curtailment signal aware, pricing aware, etc.) devices and the energy supply company. In this configuration, building subsystems that are not RTP aware will be managed by the DR layer 112 while devices that are RTP aware can get signals directly from the utility. For example, if a vehicle (e.g., PHEV) is programmed to charge only when the price of electricity is below $0.1/kWh, the PHEV can query the utility through the smart building manager and charge independently from the DR layer 112.

Enterprise Integration Layer

The enterprise integration layer 108 shown in FIG. 1A or FIG. 1B is configured to serve clients or local applications with information and services to support a variety of enterprise-level applications. The enterprise integration layer 108 may be configured to communicate (in real time or near real time) with the smart grid 104 and/or energy providers and purchasers 102. More particularly, in some embodiments the enterprise integration layer 108 may communicate with "smart meters," automated meter interfaces with utilities, carbon emission tracking and accounting systems, energy reporting systems, a building occupant interface, and traditional enterprise productivity applications (e.g., maintenance management systems, financial systems, workplace and supply chain management systems, etc.). The enterprise integration layer 108 may be configured to use protocols and methods as described above with respect to other layers or otherwise.

Building Occupant Interface

As indicated above, the enterprise integration layer 108 shown in FIG. 1B may be configured to exchange information with a building occupant interface application. In other exemplary embodiments the enterprise integration layer 108 serves the building occupant interface application to clients connecting to the enterprise integration layer 108, web services 158, and/or GUI engine 160. In yet other embodiments web services 158 may utilize GUI engine 160 for graphics rendering resources and enterprise integration layer 108 for data relating to the building occupant interface in order to provide the building occupant interface to client applications.

Communication and Security Features

Referring again to FIG. 3, the smart building manager may be configured to provide drivers for BACnet, LON, N2, Modbus, OPC, OBIX, MIG, SMTP, XML, Web services, and various other wireless communications protocols including Zigbee. These drivers may be implemented within or used by the service bus adapters or subsystem adapters. The service bus for the smart building manager may be configured to communicate using any number of smart grid communications standards. Such standards may be utilized for intra-manager communication as well as communication with a smart grid component (e.g., utility company, smart meter, etc.). For example, the smart building manager may be configured to use the ANSI C12.22/C12.19 protocol for some internal communications (e.g., DR events) as well as for communications with the smart grid. The service bus adapters and subsystem adapters convert received messages into a normalized messaging format for use on the service bus. In an exemplary embodiment the service bus is flexible, making use of IT-centric message queuing technologies (e.g., Open AMQ, MSMQ, and WebSphere MQ) to assure reliability, security, scalability, and performance. Service bus adapters enable layers and applications to communicate among one another and/or to the various in-building or external systems (e.g., via subsystem adapters). Stored communications rules may be used by the service bus adapters, subsystem adapters, or other components of the system to catch or correct communications failures. Communications and action-failure rules may also be configured for use by the action layers of the system. For example, the DR layer can check for whether an action requested or commanded by the DR layer has completed. If not, the DR layer can take a different action or a corrective action (e.g., turn off an alternate load, adjust additional setpoints, trigger a focused FDD activity, etc.) to ensure that DR needs are met. The smart building manager can also determine if someone has provided a DR override command to the system and take corrective action if available. If corrective action is unavailable, an appropriate message or warning may be sent to a DR partner (e.g., a utility co., an energy purchaser via the smart grid, etc.).

The smart building manager 106 may reside on (e.g., be connected to) an IP Ethernet network utilizing standard network infrastructure protocols and applications (e.g., DNS, DHCP, SNTP, SNMP, Active Directory, etc.) and can also be secured using IT security best practices for those standard network infrastructure protocols and applications. For example, in some embodiments the smart building manager may include or be installed "behind" infrastructure software or hardware such as firewalls or switches. Further, configurations in the smart building manager 106 can be used by the system to adjust the level of security of the smart building manager 106. For example, the smart building manager 106 (or particular components thereof) can be configured to allow its middle layers or other components to communicate only with each other, to communicate with a LAN, WAN, or Internet, to communicate with select devices having a building service, or to restrict communications with any of the above mentioned layers, components, data sources, networks, or devices. The smart building manager 106 may be configured to support a tiered network architecture approach to communications which may provide for some measure of security. Outward facing components are placed in a less secure "tier" of the network to act as a point of entry to/from the smart building manager 106. These outward facing components are minimized (e.g., a web server receives and handles all requests from client applications) which limits the number of ways the system can be accessed and provides an indirect communications route between external devices, applications, and networks and the internal layers or modules of the smart building manager 106. For example, "behind" the outward facing "first tier" may lie a more secure tier of the network that requires for authentication and authorization to occur at the first tier before functions of the more secure tier are accessed. The smart building manager 106 may be configured to include firewalls between such tiers or to define such tiers to protect databases or core components of the system from direct unauthorized access from outside networks.

In addition to including or implementing "infrastructure" type security measures as the type disclosed above, the smart building manager may be configured to include a communications security module configured to provide network message security between the smart building manager and an outside device or application. For example, if SOAP messaging over HTTP is used for communication at the enterprise integration layer, the SOAP messages may be concatenated to include an RC2 encrypted header containing authentication credentials. The authentication credentials may be checked by the receiving device (e.g., the smart building manager, the end application or device, etc.). In some embodiments the encrypted header may also contain information (e.g., bits) configured to identify whether the message was tampered with during transmission, has been spoofed, or is being "replayed" by an attacker. If a message does not conform to an expected format, or if any part of the authentication fails, the smart building manager may be configured to reject the message and any other unauthorized commands to the system. In some embodiments that use HTTP messages between the application and the smart building manager, the smart building manager may be configured to provide SSL for message content security (encryption) and/or Forms authentication for message authentication.

The smart building manager 106 may yet further include an access security module that requires any application to be authenticated with user credentials prior to logging into the system. The access security module may be configured to complete a secure authentication challenge, accomplished via a public or private key exchange (e.g., RSA keys) of a session key (e.g., an RC2 key), after a login with user credentials. The session key is used to encrypt the user credentials for the authentication challenge. After the authentication challenge, the session key is used to encrypt the security header of the messages. Once authenticated, user actions within the system are restricted by action-based authorizations and can be limited. For example, a user may be able to command and control HVAC points, but may not be able to command and control Fire and Security points. Furthermore, actions of a user within the smart building manager are written to memory via an audit trail engine, providing a record of the actions that were taken. The database component of the smart building manager 106 (e.g., for storing device information, DR profiles, configuration data, pricing information, or other data mentioned herein or otherwise) can be accessible via an SQL server that is a part of the building management server or located remotely from the smart building manager 106. For example, the database server component of the smart building manager 106 may be physically separated from other smart building manager components and located in a more secure tier of the network (e.g., behind another firewall). The smart building manager 106 may use SQL authentication for secure access to one or more of the aforementioned databases. Furthermore, in an exemplary embodiment the smart building manager can be configured to support the use of non-default instances of SQL and a non-default TCP port for SQL. The operating system of the smart building manager may be a Windows-based operating system.

Each smart building manager 106 may provide its own security and is not reliant on a central server to provide the security. Further, the same robustness of the smart building manager 106 that provides the ability to incorporate new building subsystem communications standards, modules, drivers and the like also allows it to incorporate new and changing security standards (e.g., for each module, at a higher level, etc.).

Multi-Campus/Multi-Building Energy Management

The smart building manager 106 shown in the Figures may be configured to support multi-campus or multi-building energy management services. Each of a plurality of campuses can include a smart building manager configured to manage the building, IT, and energy resources of each campus. In such an example, the building subsystems shown, e.g., in FIGS. 1A and 1B may be a collection of building subsystems for multiple buildings in a campus. The smart building manager may be configured to bi-directionally communicate with on-site power generation systems (e.g., distributed power sources, related services, solar arrays, fuel cell arrays, diesel generators, combined heat and power (CHP) systems, etc.), plug-in hybrid electric vehicle (PHEV) systems, and energy storage systems (e.g., stationary energy storage, thermal energy storage, etc.). Data inputs from such sources may be used by the demand and response layer of the smart building manager to make demand or response decisions and to provide other ancillary services to a connected smart grid (e.g., utility, smart meter connected to a utility, etc.) in real time or near real time. For example, the smart building manager may communicate with smart meters associated with an energy utility and directly or indirectly with independent systems operators (ISOs) which may be regional power providers. Using these communications, and its inputs from devices of the campus, the smart building manager (e.g., the demand response layer) is configured to engage in "peak shaving," "load shedding," or "load balancing" programs which provide financial incentives for reducing power draw during certain days or times of day. The demand response layer or other control algorithms of the smart building manager (e.g., control algorithms of the integrated control layer) may be configured to use weather forecast information to make setpoint or load shedding decisions (e.g., so that comfort of buildings in the campus is not compromised). The smart building manager may be configured to use energy pricing information, campus energy use information, or other information to optimize business transactions (e.g., the purchase of energy from the smart grid, the sale of energy to the smart grid, the purchase or sale of carbon credits with energy providers and purchasers, etc.). The smart building manager is configured to use the decisions and processing of the demand response layer to affect control algorithms of the integrated control layer.

While FIG. 1B is shown as a tightly-coupled smart building manager 106, in some embodiments the processing circuit of FIG. 1B (including the layers/modules thereof) may be distributed to different servers that together form the smart building manager having the control features described herein. In embodiments where the smart building manager 106 is controlling an entire campus or set of campuses, one or more smart building managers may be layered to effect hierarchical control activities. For example, an enterprise level smart building manager may provide overall DR strategy decisions to a plurality of lower level smart building managers that process the strategy decisions (e.g., using the framework shown in FIG. 3) to effect change at an individual campus or building. By way of further example, the "integrated control layer" 116 and the "building system integration layer" 118 may be replicated for each building and stored within lower level smart building servers while a single enterprise level smart building manager may provide a single higher level layer such the DR layer. Such a DR layer can execute a campus-wide DR strategy by passing appropriate DR events to the separate lower level smart building mangers having integrated control layers and building system integration layers. Higher level servers may provide software interfaces (APIs) to the one or more lower level servers so that the one or more lower level servers can request information from the higher level server, provide commands to the higher level server, or otherwise communicate with the layers or data of the higher level server. The reverse is also true, APIs or other software interfaces of the lower level servers may be exposed for consumption by the higher level server. The software interfaces may be web services interfaces, relational database connections, or otherwise.

Demand Limiting and Energy Storage

As noted previously, the DR layer 112 may be configured to use a building pre-cooling algorithm in the night or morning and rely on the thermal storage characteristics of the building itself to reduce peak demand for cooling. In many regions, the cost of receiving electrical power from an energy provider depends not only on the actual consumption of power, but also on building's peak demand during a particular time period. In general, a building's peak demand corresponds to the maximum amount of power used by the building at any given time during a specified time period. For example, the total load on the power grid may be higher during certain times of the day. In such a case, the energy provider may charge a higher price for electricity during these times, or demand other taxes or surcharges, based on the user's peak demand.

The DR layer 112 may employ a demand limiting approach to flatten a building's demand profile, thus lowering its peak demand. This translates into cost savings for the operator of the building and also allows the energy provider to better predict overall demand for the smart grid. In some cases, power usage by certain devices in the building may be limited during a demand limiting period as part of a demand limiting strategy. In the context of HVAC and other building subsystems, it is advantageous for a demand limiting strategy to stop short of making habitation of the building uncomfortable. For example, a smart building manager having a demand limiting feature may constrain temperature inside of the building to a particular range during the demand limiting period, in order to ensure that the temperature stays within a specified comfort region.

Figure 4:
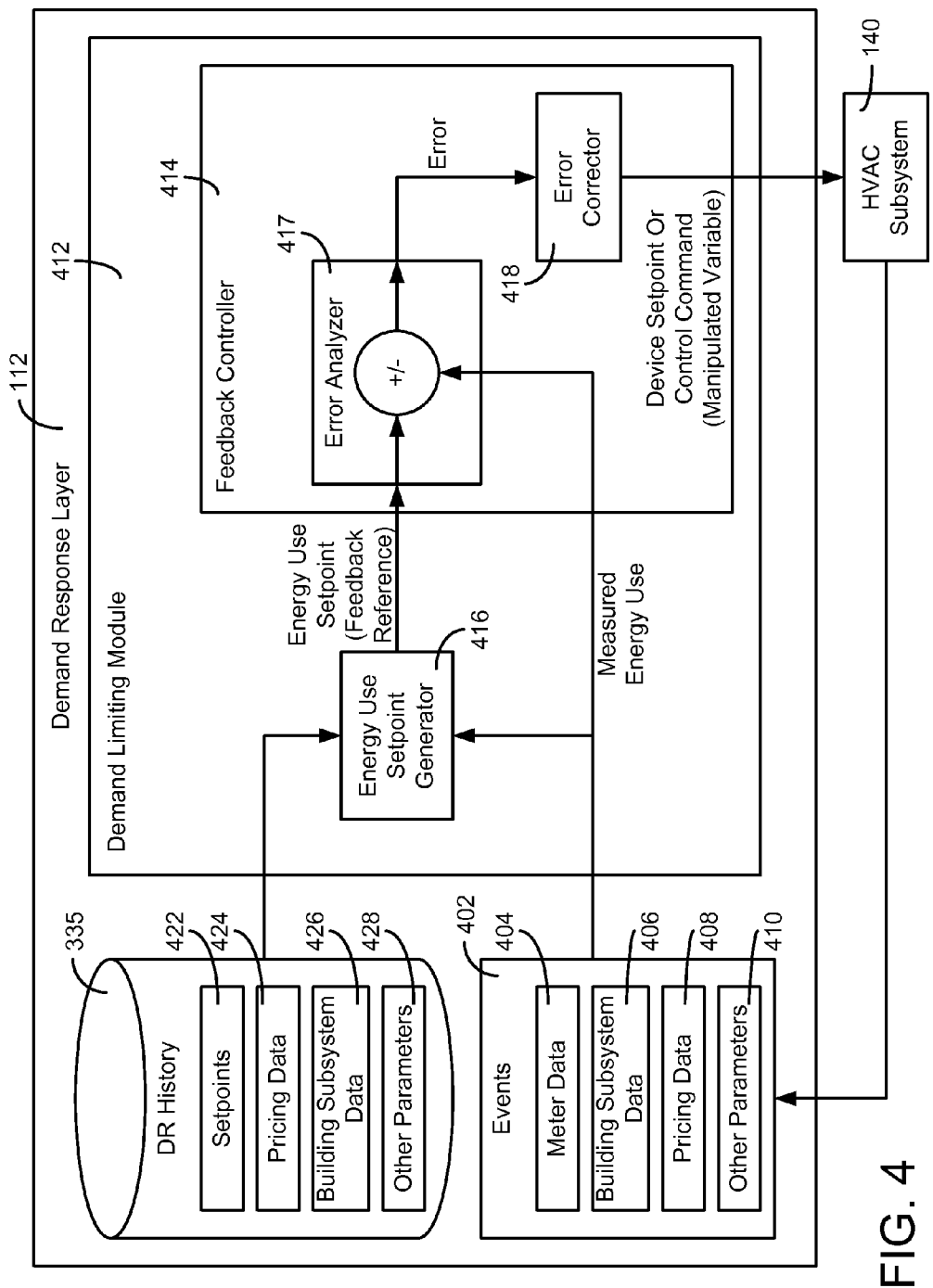
FIG. 4 is a detailed diagram of the demand response layer as shown in FIGS. 1A and 1B, according to an exemplary embodiment.

Referring now to FIG. 4, the DR layer 112 is shown in greater detail, according to an exemplary embodiment. DR layer 112 includes demand limiting module 412. Demand limiting module 412 is configured to control energy use of one or more building subsystems during a demand limiting period. Demand limiting module 412 may include a plurality of sub-modules configured to facilitate the demand limiting activity for varying types or numbers of building subsystems. In the exemplary embodiment shown in FIG. 4, demand limiting module 412 is shown to include energy use setpoint generator 416 and feedback controller 414. Although only a single energy use setpoint generator 416 and a single feedback controller 414 are shown in FIG. 4, multiple energy use setpoint generators and multiple feedback controllers may be provided in any one demand limiting module, demand response layer, or smart building manager. For example, a different energy use setpoint generator and a different feedback controller may be provided for each building subsystem to be controlled in a demand limiting fashion.

Demand limiting module 412 is configured to use a feedback controller 414 to control energy use of a building subsystem to an energy use setpoint. In the illustration of FIG. 4, feedback controller 414 controls the energy use of HVAC subsystem 140 (e.g., an HVAC subsystem that regulates building space temperature) based on an energy use setpoint. Feedback controller 414 can control the energy use of HVAC subsystem 140 based on energy use setpoints calculated by energy use setpoint generator 416. In varying alternative embodiments, feedback controller 414 can receive or calculate energy use setpoints without receiving the setpoints from energy use setpoint generator. In another embodiment, feedback controller 414 can include energy use setpoint generator 416. Feedback controller 414 can override user-provided temperature setpoints provided to HVAC subsystem 140 during a demand limiting period. In other embodiments, feedback controller 414 can operate the HVAC subsystem 140 outside of a demand limiting period.

Feedback controller 414 is configured to manipulate one or more HVAC subsystem setpoints (e.g., a temperature setpoint) based on the energy use setpoint and measured energy use. In some embodiments, feedback controller 414 may be integrated directly into the control of a device in HVAC subsystem 140, thereby providing direct control over the subsystem or a device thereof. In other embodiments, feedback controller 414 may be used as part of a cascading control strategy for a device in HVAC subsystem 140 and provide one or more device setpoints to the controller of the device. For example, a temperature setpoint may be sent from feedback controller 414 to one or more controllers that regulate a variable air volume (VAV) box, an air handling unit (AHU), or a chiller in HVAC subsystem 140 based on the received temperature setpoint.

In general, the energy use setpoint and the measured energy use may be values that correspond to the use of energy by one or more devices in HVAC subsystem 140. For example, the energy use setpoint may be a heat transfer rate or an electrical power rate (e.g., in units of kW) indicative of electrical power used by HVAC subsystem 140. In some embodiments, the energy use setpoint and the measured energy use may be values that correspond to an overall building energy usage (consumption and/or power).

In some embodiments, a proxy value may also be used to represent an energy use. For example, if demand limiting module 412 is used to provide direct control over a device in HVAC subsystem 140, such as a VAV box, a flow setpoint may be used as a proxy for the energy use setpoint and a flow reading may be used as a proxy for the measured energy use.

Utilizing a feedback control loop (e.g., as provided by feedback controller 414) for controlling an HVAC subsystem to an energy use setpoint advantageously allows for generation of control commands or device setpoints without the use of a thermal model for the building (e.g., how the mass of the building stores and transfers thermal energy). For example, several model-based approaches are discussed in the article "Development of Methods for Determining Demand-Limiting Setpoint Trajectories Using Short-Term Measurements" by K. Lee and J. Braun, Building and Environment (2007). In such approaches, however, the effectiveness of the demand limiting strategy also depends on the accuracy of the thermal model. Additionally, model-based approaches often assume that the thermal model is invariant or linear, leading to potential sources of error if the model is no longer valid (e.g., if an aspect of the building space or building space's use changes).

The DR layer 112 receives information from event data 402, which corresponds to a store or stream of real-time, near real-time, or other parameters associated with demand limiting module 412. Event data 402 may include meter data 404 (e.g., a measured energy or power draw from smart grid 104 by the building, a measured energy or power use by HVAC subsystem 140 or a device thereof, etc.) received from a building meter, sub-meter associated only with the HVAC subsystem, a device that estimates energy use based on other building automation system values, or another device that measures energy use. Event data 402 may also include building subsystem data 406 which may include measured or calculated values associated with HVAC subsystem 140 (e.g., temperature data, air flow data, pressure data, etc.). Event data 402 may further include pricing data 408 for electrical energy use of smart grid 104. Pricing data 408 may be preloaded or provided by energy provider 102 periodically or in real-time. Event data 402 may also include other parameters 410 which provide additional constraints for the operation of demand limiting module 412 or to override its default operation. For example, other parameters 410 may include timing information (e.g., a start time to begin demand limiting, an end time to end demand limiting, a length of time for the demand limiting period, etc.), threshold information (e.g., temperature constraints or thresholds that define an acceptable comfort range, an acceptable energy use based on financial constraints, etc.), or override parameters (e.g., a parameter that disables demand limiting module 412, a parameter that changes the control strategy of feedback controller 414, etc.).

The DR layer 112 also includes DR History 335, which stores previous values associated with demand limiting module 412. The DR History 335 may include historical events, such as historical pricing data 424, historical building subsystem data 426, or other historical parameters 428. The DR History 335 may also include historical setpoints 422 associated with demand limiting module 412 (e.g., previous energy use setpoints, previous temperature setpoints, etc.). DR History 335 may provide demand limiting module 412 with data for using previous measurements and values to adapt to future conditions and to generate new energy use setpoints.

Demand limiting module 412 is shown to include energy use setpoint generator 416. Energy use setpoint generator 416 generates the energy use setpoint (e.g., feedback reference value) for feedback controller 414. In one embodiment, energy use setpoint generator 416 may use the DR History 335 to generate the energy use setpoint. For example, one or more zones in the building may be subject to demand limiting. If so, a comfort range of temperatures may be imposed on the affected zones using temperature threshold values in other parameters 410. In such a case, energy use setpoint generator 416 may use a historical energy use setpoint, the temperature threshold values, and historical temperature readings from the end of a previous demand limiting period to generate a new energy use setpoint such that the estimated zone temperature at the end of the current demand limiting period is less than or equal to the maximum allowed temperature threshold.

By way of example, demand limiting may be imposed on the first, second, and third floors of the building during peak electrical usage hours. A temperature comfort range of 70° F. and 75° F. may also be defined for these zones during demand limiting periods. During the demand limiting period of the previous day, the first floor reached a maximum of 72° F., the second floor reached a maximum of 73° F., and the third floor reached a maximum of 74° F. Energy use setpoint generator 416 may use this information with the previous energy use setpoint to generate a new energy use setpoint such that the third floor would reach a maximum of 75° F. during the current demand limiting period. This control configuration may advantageously allow energy costs to be minimized by taking advantage of the thermal storage properties of the building during the demand limiting period.

In some embodiments, energy use setpoint generator 416 may use a statistical approach to generate the energy use setpoint. A statistical approach may include using pricing data 408 or another metric to optimize a cost function. For example, probability distributions may be built and stored in DR history 335 that correspond to the load profile of HVAC subsystem 140 during non-demand limiting periods and used to develop a probability of staying under the maximum temperature comfort threshold given varying energy use setpoint. If an energy use setpoint was able to keep the maximum controlled temperature under the comfort threshold during the demand limiting period, it may be deemed a success. Similarly, if an energy use setpoint causes a controlled temperature to exceed the maximum comfort threshold, it may be deemed a failure. A cost function using the probabilities of success and failure can then be used to determine an energy use setpoint that optimizes financial savings.

For example, an energy use setpoint may be determined by optimizing the following:

$$J = P(\text{success}|SP)(\text{savings}) - P(\text{failure}|SP)(\text{additional\_cost})$$

where P(success|SP) is the probability of success given a particular energy use setpoint, savings is the financial savings if the setpoint is successful, P(failure|SP) is the probability of failure given the particular energy use setpoint, and additional_cost is the additional financial cost if the setpoint is unsuccessful.

Feedback controller 414 is shown to include error analyzer 417. Error analyzer 417 is configured to evaluate the error in the feedback loop (e.g., the difference between the energy use setpoint and the measured energy use). Error analyzer 417 receives the energy use setpoint as a feedback reference value and compares it with the measured energy use (e.g., the current rate of energy use, etc.) to produce an error value.

Feedback controller 414 also includes error corrector 418, which receives the error value from error analyzer 417 and operates to reduce the amount of error by generating a manipulated variable (e.g., a device setpoint or a direct control command) for one or more devices in HVAC subsystem 140. In cases in which demand limiting module 412 provides direct control over an HVAC device, error corrector 418 may generate a direct control command for that device. For example, if demand limiting module 412 is directly integrated into the controller of a VAV box in HVAC subsystem 140, error corrector 418 may generate a control command that regulates the flow through the VAV box by controlling a damper position. In cases in which feedback controller 414 provides cascade control over the one or more devices in HVAC subsystem 140, error corrector 418 may generate a device setpoint for use in another control loop. For example, error corrector 418 may generate a zone temperature setpoint for the zones of the building that are subject to demand limiting and provide it to a temperature control loop of a VAV box.

Error corrector 418 may utilize any known form of control strategy to reduce the error value, such as proportional-integral (PI) control, proportional-derivative (PD) control, etc., depending on the type of value used for the energy use. For example, a PI or integral controller may be used to directly modify a temperature setpoint or a PI or proportional controller may be used to control the rate of increase of a temperature setpoint. In some embodiments, error corrector 418 may also utilize a feedforward approach that incorporates a model-based approach to determine a temperature setpoint trajectory over the demand limiting period. Error corrector 418 may then use the temperature setpoint trajectory in conjunction with the control loop of feedback controller 414 for fine tuning. In other embodiments, error corrector 418 may also adjust its output only at discrete times. For example, error corrector 418 may analyze the error value every five minutes or at any other length of time during a demand limiting period.

One or more devices in HVAC subsystem 140 receive the device setpoint or control command from error corrector 418 and adjust their operation, accordingly. For example, if the energy use is a heat transfer rate for an AHU in HVAC subsystem 140, error corrector 418 may generate a zone temperature setpoint for building zones serviced by the AHU. This temperature setpoint may then be used by the individual control loops for the devices associated with the AHU (e.g., VAV boxes, etc.), to regulate the temperatures in the affected zones. Sensor data from HVAC subsystem 140 may be used to calculate the measured heat transfer rate for the AHU and provided back to demand limiting module 412, thereby completing the feedback loop.

Figure 5:
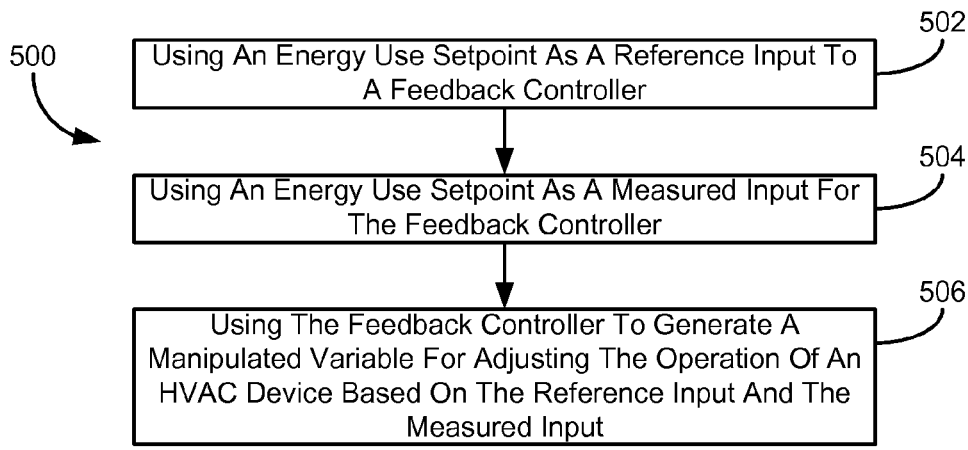
FIG. 5 is a flow diagram of a process for generating a device setpoint or control command for one or more HVAC devices, according to an exemplary embodiment.

Referring now to FIG. 5, a process 500 for generating a device setpoint or control command for one or more HVAC devices is shown, according to an exemplary embodiment. Process 500 includes using an energy use setpoint as a reference input to a feedback controller (step 502). The energy use setpoint may correspond to the desired amount of electrical power (e.g., in units of kW) used by the one or more HVAC devices. The energy use setpoint may alternatively correspond to a proxy for energy use (e.g., the amount of heat transfer between the one or more HVAC devices and the building). For example, if the temperature at the inlet of a VAV box remains constant, the flow through the VAV box may be used as a proxy for the amount of thermal energy transferred by it. In other embodiments, the energy use setpoint may be a rate (e.g., measured in kW, BTU/hr, etc.) or a maximum rate at which the energy should be transferred.

Process 500 also includes using an energy use as a measured input for the feedback controller (step 504). In some embodiments, the energy use may be a direct measurement. For example, the energy use may be measured directly at the meter connecting the building to an electric grid. In other embodiments, the energy use may be calculated or estimated from other building values or measurements. For example, temperature and flow readings may be used to estimate the electrical energy usage or the amount of thermal energy transferred between the one or more HVAC devices and the building.

Process 500 further includes using the feedback controller to generate a manipulated variable for adjusting the operation of an HVAC device based on the reference input and the measured input (step 506). The feedback controller may provide either direct control over the HVAC device (e.g., the manipulated variable is a control command) or as part of a cascade control over the device (e.g., the manipulated variable is itself a setpoint used by the control loop that actually controls the device). Utilizing feedback control based on energy use allows for demand limiting to be performed that takes advantage of the thermal storage capabilities of the building itself, without having to actually model the thermal properties of the building.

Figure 6:
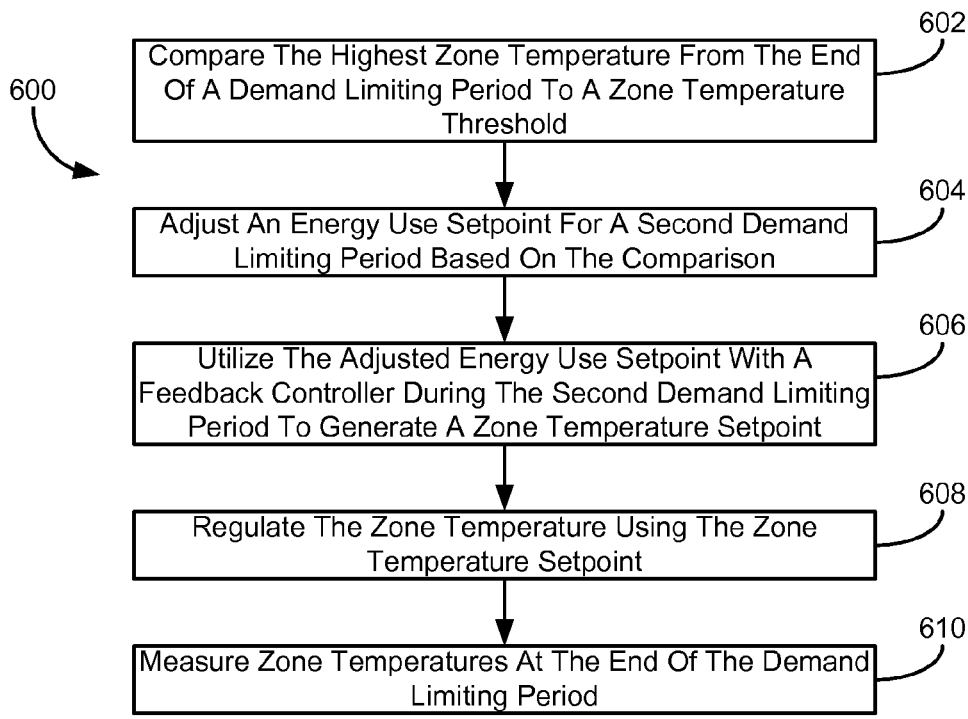
FIG. 6 is a flow diagram of a process for using demand limiting in a building HVAC system, according to an exemplary embodiment.

Referring now to FIG. 6, a process 600 for using demand limiting in a building HVAC system is disclosed, according to an exemplary embodiment. Process 600 utilizes a zone temperature setpoint to regulate the temperatures of building zones subject to demand limiting, during a demand limiting period. Process 600 includes comparing the highest zone temperature at the end of a demand limiting period to a zone temperature threshold (step 602). During a demand limiting period, the temperatures in affected building zones may be allowed to vary, so long as they do not exceed a specified comfort level, i.e., one or more zone temperature thresholds. During this period, electrical energy use by the HVAC system may be minimized by providing only the amount of cooling or, alternatively, heating necessary to keep the zone temperatures from exceeding the temperature threshold.

Process 600 also includes adjusting an energy use setpoint for a second demand limiting period based on the comparison (step 604). In the optimal case, the highest zone temperature at the end of the demand limiting period is equal to the zone temperature threshold or within a specified margin of error. However, if the highest zone temperature differs from the zone temperature threshold, the energy use setpoint should be modified for the subsequent demand limiting period. For example, a history of one or more previous energy use setpoints may be maintained and used to predict a setpoint trajectory that is estimated to result in the highest zone temperature reaching the zone temperature threshold at the end of the next demand limiting period.

Adjustment of the energy use setpoint may be achieved in any number of ways. In some embodiments, the energy use setpoint may be adjusted using statistical or predictive approaches to calculate a setpoint estimated to cause the highest zone temperature to arrive at the zone temperature threshold at the end of a second demand limiting period. For example, statistical methods may include techniques utilizing probabilities of success or failure, one or more cost functions, trending information, game theory, or any other adaptive approach to optimize the energy use setpoint. In other embodiments, control system techniques may be used to calculate the energy use setpoint using feedback from the previous setpoint, the zone temperature values at the end of the last demand limiting period, and one or more zone temperature thresholds. In further embodiments, self-learning approaches such as artificial neural networks, Bayesian networks, and other artificial intelligence-based techniques may be utilized to optimize the energy use setpoint. In yet further embodiments, setpoint values may be predefined in memory (e.g., in a database, a LUT, etc.) and searched for an appropriate energy use setpoint, based on the comparison in step 602.

Process 600 further includes using the adjusted energy use setpoint with a feedback controller during the second demand limiting period to generate a zone temperature setpoint (step 606). In HVAC applications, the device controller of an HVAC device may not allow for non-default methods of control. For example, the device controller may utilize a temperature-based control loop to regulate temperature to a temperature setpoint. Cascaded control allows the HVAC device to still be controlled using an energy use setpoint by employing a first control loop that generates the temperature setpoint for the temperature-based control loop. The zone temperature setpoint may be provided to any number of HVAC devices subject to demand limiting. Other types of setpoints may also be generated by the energy-use feedback controller, depending on the variables used in an HVAC device's control loop (e.g., flow rate, pressure, etc.). In further embodiments, a hybrid approach may be taken where the energy use setpoint is used to provide direct control over some HVAC devices and cascade control over other HVAC devices.

Process 600 additionally includes regulating the zone temperature using the zone temperature setpoint (step 608). The zone temperature setpoint may then be used by the HVAC devices servicing the zones subject to demand limiting as a reference input for their individual control loops. For example, the zone temperature setpoint may be provided to the controller of a VAV box servicing the first floor a building that uses a temperature-based control loop. The VAV box may then provide more or less cooling to the floor, based on the zone temperature setpoint and the current zone temperature.

Process 600 further includes measuring zone temperatures at the end of the demand limiting period (step 610). This allows an iterative process to occur where the energy use setpoint is evaluated and adjusted as needed. For example, if any of the zone temperatures in the zones subject to demand limiting exceeded the zone temperature threshold, the energy use setpoint for HVAC cooling may have been too low. In such a case, it may be raised for a subsequent demand limiting period. Conversely, if all of the zone temperatures fell below the zone temperature threshold, the energy use setpoint for HVAC cooling may have been too high and may be adjusted down, in order to increase energy savings.

Figure 7:
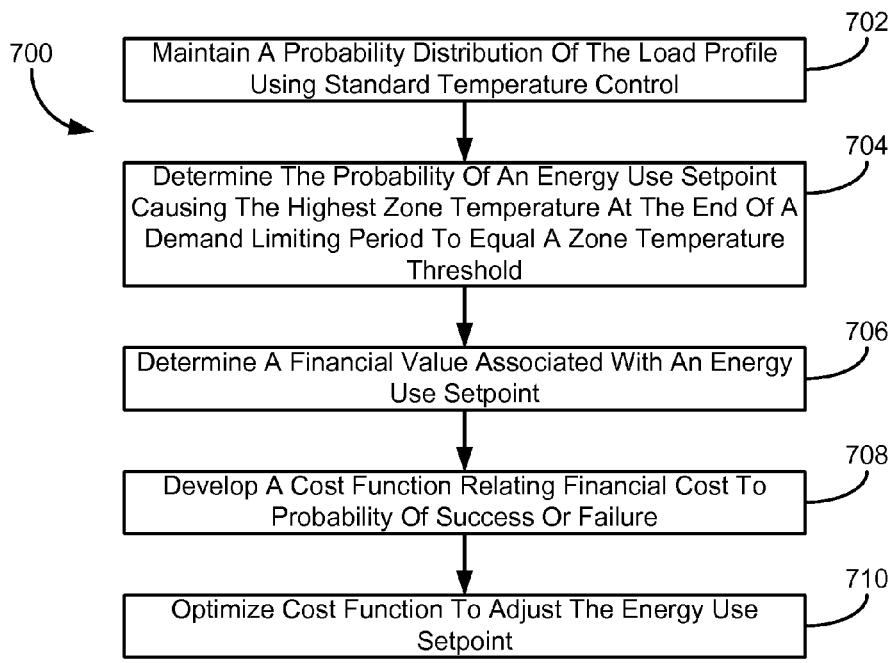
FIG. 7 is a flow diagram of process for using a statistical approach to adjust an energy use setpoint, according to an exemplary embodiment.

Referring now to FIG. 7, a process 700 for using a statistical approach to adjust an energy use setpoint is disclosed, according to an exemplary embodiment. Process 700 includes maintaining a probability distribution of the load profile while using normal temperature control, i.e., when demand limiting is not used (step 702). For example, the load profile probability distribution may be built using power measurements from the utility meter obtained during days in which demand limiting is not used.

Process 700 also includes determining the probability of an energy use setpoint causing the highest zone temperature at the end of a demand limiting period to equal a zone temperature threshold, given a particular energy use budget (step 704). The probabilities of success or failure may be obtained through actual use of the energy use setpoints in the building while employing demand limiting or via modeling their likely outcome, based on a load profile probability distribution. In an exemplary embodiment, a load profile probability distribution may be determined by observing relationships between temperatures and energy use during conventional control.

Process 700 further includes determining a financial value associated with an energy setpoint (step 706). Financial values may be determined, for example, based on pricing data received from an energy provider. If an energy use setpoint is successful, a financial savings should result from its use during a demand limiting period. Similarly, if it fails, a financial cost may also be determined for the failure. In this way, the statistical approach of process 700 may be used to adjust the energy use setpoint to further enhance the energy savings during demand limiting periods.

Process 700 additionally includes developing an objective function relating a financial cost to a probability of success or failure (step 708). In general, the objective function may be used to weigh the potential for savings versus the potential for additional cost, given a particular energy use setpoint. For example, an exemplary objective function is as follows:

$$J = P(\text{success}|SP)(\text{savings}) - P(\text{failure}|SP)(\text{additional\_cost})$$

where J is a measure of potential for savings, $P(\text{success}|SP)$ is the probability of success given a particular energy use setpoint, savings is the financial savings if the setpoint is successful, $P(\text{failure}|SP)$ is the probability of failure given the particular energy use setpoint, and additional_cost is the additional financial cost if the setpoint is unsuccessful.

Process 700 also includes optimizing the objective function to adjust the energy use setpoint (step 710). Where the objective function weighs the potential for savings versus the potential for added cost, the energy use setpoint that corresponds with the most likely amount of savings may be selected. This allows for financial cost to be tied to the energy use setpoint adjustment process, thereby also optimizing the financial savings during demand limiting periods.

Figure 8:
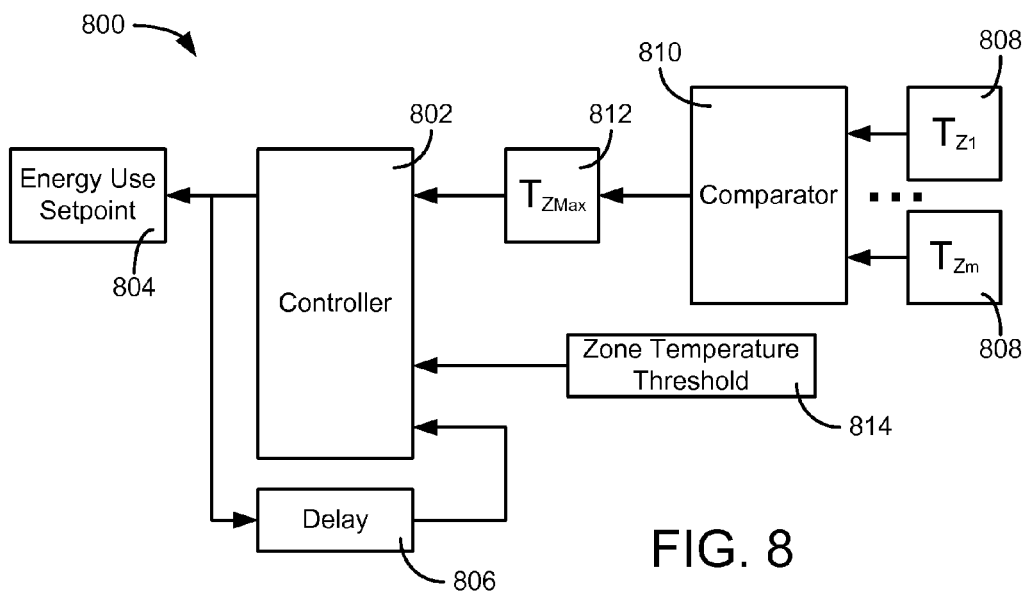
FIG. 8 is a block diagram of a control strategy for adjusting the energy use setpoint, according to an exemplary embodiment.

Referring now to FIG. 8, a control strategy 800 for adjusting the energy use setpoint is disclosed, according to an exemplary embodiment. Control strategy 800 makes use of a controller 802, which utilizes feedback control to adjust energy use setpoint 804. Controller 802 operates to adjust energy use setpoint 804 such that energy use setpoint 804 is estimated to cause the highest zone temperature at the end of a demand limiting period to be equal to zone temperature threshold 814, or within a margin of error.

Delay 806 may be used by control strategy 800 to delay the feedback of energy use setpoint 804 by a predetermined amount of time. For example, energy use setpoint 804 may be held constant during a demand limiting period. Delay 806 allows energy use setpoint 804 to be held constant for the duration of the demand limiting period. In addition, delay 806 may also be employed if demand limiting is only periodically used. For example, delay 806 may delay the feedback of energy use setpoint 804 until the next demand limiting day, i.e., the previous day's demand limiting setpoint is used as an input to controller 802.

In addition to feedback from energy use setpoint 804, controller 802 also receives maximum zone temperature 812 as input, which is the highest zone temperature at the end of the previous demand limiting period. Zone temperatures 808 from the zones subjected to demand limiting are measured at the end of the previous demand limiting period and used as an input to comparator 810. Comparator 810 then compares zone temperatures 808 and selects the highest temperature as maximum zone temperature 812.

Controller 802 also receives zone temperature threshold 814 as an input. Zone temperature threshold 814 represents the most extreme temperature allowed in any building zone subject to demand limiting during the demand limiting period. In some embodiments, zone temperature threshold 814 may be range of acceptable temperatures, i.e., an upper temperature threshold and a lower temperature threshold.

Controller 802 evaluates the delayed energy use setpoint 804 to evaluate its ability to cause maximum zone temperature 812 to approach zone temperature threshold 814. If maximum zone temperature 812 is not equal to zone temperature threshold 814, controller 802 then adjust energy use setpoint 804 up or down, accordingly, for use during a demand limiting period. Additionally, if the temperature threshold is achieved before the end of the demand limiting period, then the energy budget can be calculated (e.g., by controller 802) to increase the next day (e.g., after informing a user of the increase). Such logic of controller 802 may advantageously prevent the temperature from encroaching on the temperature threshold during the next day. In an exemplary embodiment, downstream controllers will prevent the actual zone temperature from exceeding above a maximum temperature constraint. Even in such embodiments, it may not be optimal for the temperature to be 'stuck' or oscillating just below the maximum temperature constraint during the entirety of the demand limiting period. Accordingly, the energy budget can be adjusted by controller 802 such that the maximum temperature constraint is just about to be reached by the end of the demand limiting period.

Figure 9A:
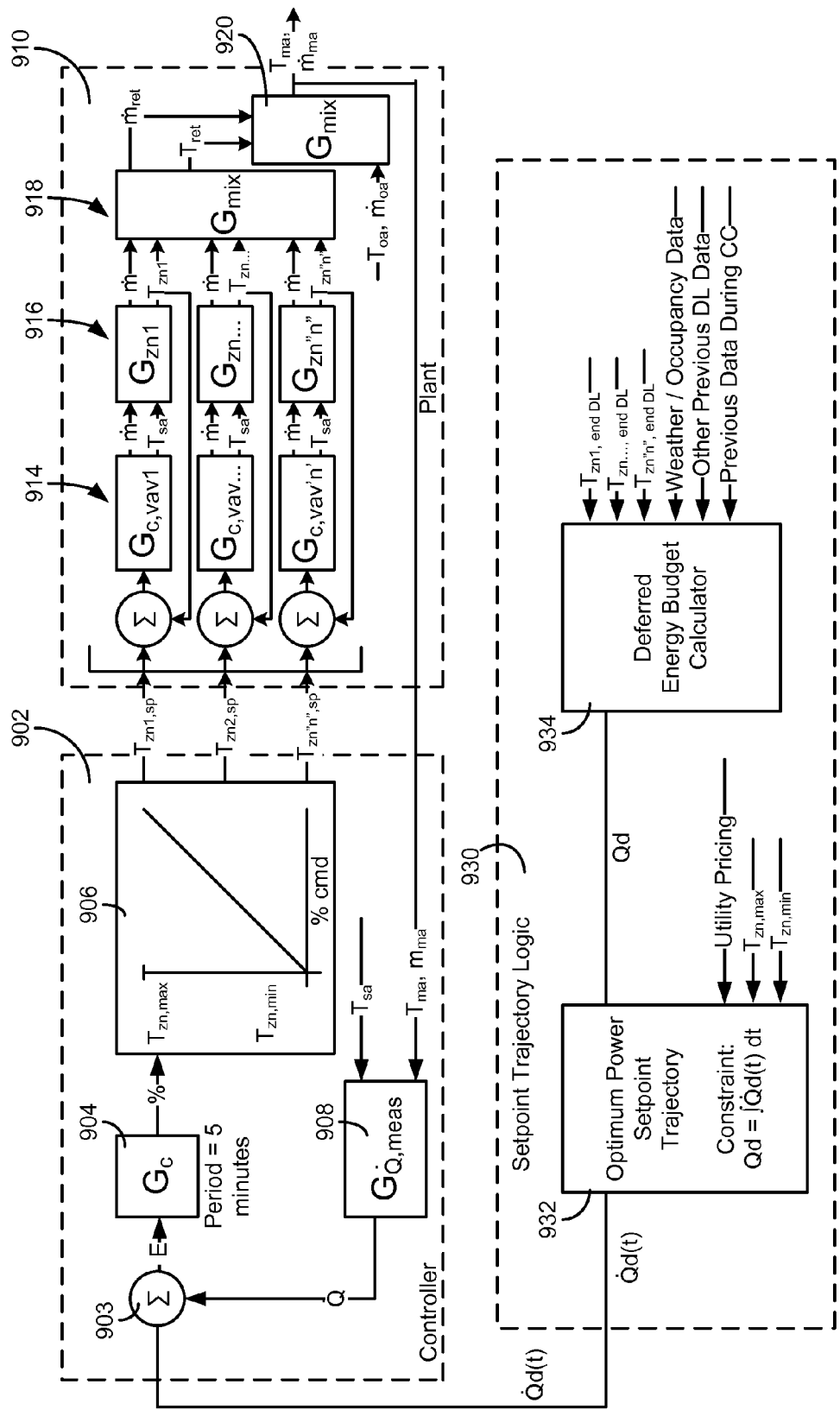
FIG. 9A is a detailed block diagram of a demand limiting control system for controlling an HVAC subsystem, according to an exemplary embodiment.

Referring now to FIG. 9A, a demand limiting control system for controlling an HVAC subsystem is shown, according to an exemplary embodiment. The demand limiting control system of FIG. 9A may be implemented by any number of combinations of software and/or hardware. In some embodiments, the demand limiting control system may be used as part of a building management system. For example, the demand limiting control system may be used to regulate a plant 910, such as the HVAC subsystem shown in FIG. 9A. The demand limiting control system is generally shown to include controller 902, plant 910, and setpoint logic 930. Although controller 902, plant 910, and setpoint logic 930 are shown as being separate in FIG. 9A, some of their functions may be implemented in a single device or across multiple devices. For example, while controller 902 and setpoint logic 930 are shown as being separate, they may be implemented in the same processing device or their functions may be performed across multiple processing devices.

The demand limiting control system of FIG. 9A is shown to include plant 910. Plant 910 represents any number of devices that may be subject to demand limiting. In some cases, the devices may be part of a subsystem for a building management system. For example, plant 910 may be an HVAC subsystem that includes one or more HVAC devices (e.g., VAV boxes, AHUs, chillers, mixers, etc.). Each device may also be associated with one or more device controllers that regulate the functions of the device. For example, plant 910 may include one or more VAV box controllers 914, which control the operations of one or more VAV boxes. The VAV boxes may also be provided air by one or more mixers, such as those found in an AHU. Each mixer may have an associated mixer controller, such as mixer controllers 918, 920. In addition to controllers associated with physical devices, plant 910 may include controllers for a particular region of space, such as one or more zone controllers 916. Zone controllers 916 may be used to balance AHU heat load. In other examples, plant 910 may include controllers that regulate building temperatures at the zone or chiller plant level.

The various controllers in plant 910 may operate their associated physical devices relative to one or more setpoints. For example, VAV box controllers 914 may regulate one or more VAV boxes relative to desired temperature setpoints (e.g., zone temperature setpoint $T_{zn1,sp}, T_{zn,sp}, T_{zn''n'',sp}$). Zone controllers 916 may use temperature and airflow readings (e.g., supplied air temperature $T_{sa}$ and airflow rate $\dot{m}$) from the VAV boxes to provide feedback control over the VAV boxes relative to the temperature setpoint. Accordingly, plant 910 itself may be seen as having one or more output parameters that may be controlled by regulating one or more input parameters. For example, a zone temperature setpoint may be provided to plant 910, which uses it as part of its internal controls. Output parameters from plant 910, such as the temperature and flow rate of mixed air, may then vary with the provided zone temperature setpoint.

The demand limiting control system may also include controller 902. Controller 902 uses comparator 903 to compare a value associated with measurements from plant 910 (e.g., heat transfer rate or building power $\dot{Q}$) to an energy use setpoint trajectory (e.g., heat transfer rate setpoint trajectory or building power setpoint trajectory $\dot{Q}d(t)$). Controller 902 uses this comparison to provide demand limiting control over plant 910 by generating one or more manipulated variables. For example, controller 902 may generate a zone temperature setpoint (temperature setpoint $T_{zn,sp}$) used as an input parameter by plant 960. Measurements taken at the mixer of plant 910, such as temperature or airflow, may also be used to provide feedback to controller 902. In some embodiments, controller 902 may use a PID or feedforward with feedback control strategy to improve its response.

As shown, comparator 903 may compare heat transfer rate $\dot{Q}$ to heat transfer rate setpoint trajectory $\dot{Q}d(t)$. Controller 902 may use estimator 908 to estimate the value for heat transfer rate $\dot{Q}$ using the measurements from plant 910 (e.g., supply air temperature $T_{sa}$, mixer airflow rate $m_{ma}$, and mixer temperature $T_{ma}$). In other embodiments, other variables and measured values associated with an energy use may be used by controller 902.

Command generator 904 receives the comparison from comparator 903 and uses it to generate a manipulated variable (or variables) for plant 910. In some embodiments, command generator 904 may only update the control command periodically (e.g., every five minutes, fifteen minutes, every half hour, etc.). Command generator 904 may also use a parameter characteristic module 906 to transform or otherwise apply constraints to the manipulated variable output from controller 902. For example, command generator 904 may regulate the temperature setpoints provided to plant 910 where the setpoint for each specific zone may be uniquely based on the Tmin or Tmax for the specific zone. During a demand limiting period, the temperature setpoint may be regulated such that the highest zone temperature at the end of the demand limiting period equals a maximum zone temperature. In this case, command generator 904 and parameter characteristic module 906 may then operate to maintain the proper temperature trajectory during a demand limiting period.

The demand limiting control system is further shown to include setpoint trajectory logic 930. Setpoint trajectory logic 930 generates a heat transfer rate setpoint trajectory $\dot{Q}d(t)$ for use by comparator 903 of controller 902 during a time t. In general, the energy use setpoint may be used by controller 902 to regulate the rate of heat transfer for plant 910 by controlling the temperature setpoint for plant 910.

In some embodiments, setpoint logic 930 includes a deferred energy budget calculator 934 and an optimum power setpoint trajectory module 932. Deferred energy budget calculator 934 may be configured to calculate an energy budget Qd for a next demand limiting period using data from a previous demand limiting period (e.g., zone temperature information from a previous demand limiting period) as well as weather or occupancy data, other previous demand limiting data, and/or previous data during a normal command and control (CC) (or other non-demand limiting) period. Such inputs can be used to determine the realistic target for deferred energy during a demand limiting period. For example, if occupancy is high or weather is hot, it may not be possible to curb much energy and keep zone temperatures within constraints. Accordingly, the deferred energy budget calculator may determine that more energy can be curbed (i.e., lower total heat transfer during a demand limiting period is possible) when occupancy is low and weather is mild. The deferred energy budget Qd can be provided to optimum power setpoint trajectory module 932. Optimum power setpoint trajectory module 932 can use the deferred energy budget Qd calculated by the deferred energy budget calculator to calculate an energy (power, in this example) setpoint trajectory $\dot{Q}d(t)$ for a time t. $\dot{Q}d(t)$ may be subjected to the constraint $[Qd=\int \dot{Q}d(t)dt]$ as well as pricing constraints and/or temperature zone constraints. Accordingly, optimum power setpoint trajectory module 932 may be configured to vary setpoint trajectory based on weather and/or current pricing. Accordingly, if price is varying during a demand limiting period, module 932 may adjust setpoint trajectory $\dot{Q}d(t)$ for a new time t. Accordingly, $\dot{Q}$ output from module 908 can be a measure of instantaneous heat transfer rate from the plurality of zones. Comparator 903 then compares a target instantaneous heat transfer rate $\dot{Q}d(t)$ to the measure of instantaneous heat transfer rate. Accordingly, controller 902 operates according to energy feedback (i.e., the heat transfer rate) and generates the manipulated variable(s) of temperature setpoints rather than adjusting the manipulated variable of temperature to match a setpoint temperature.

Figure 9B:
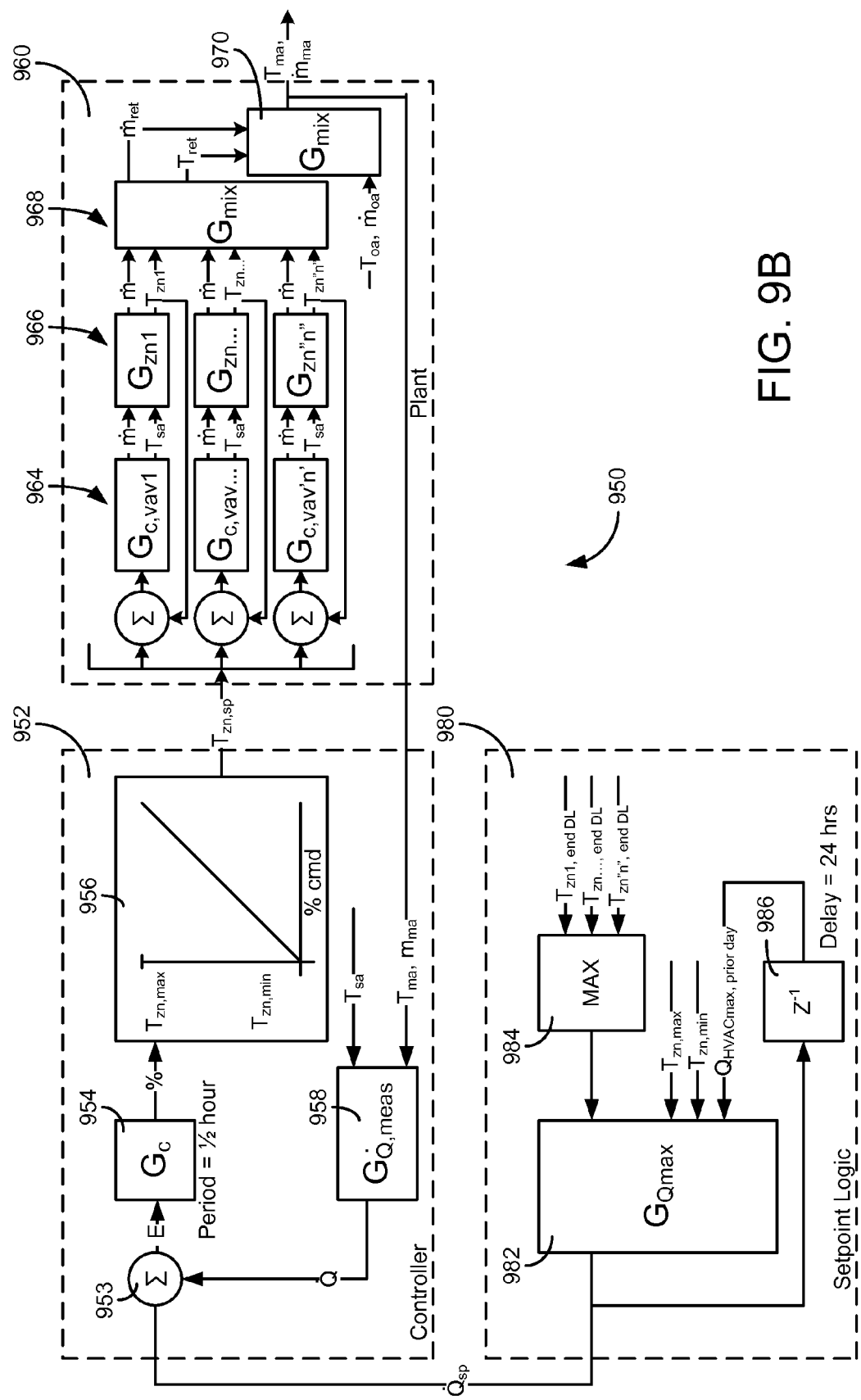
FIG. 9B is another demand limiting control system for controlling an HVAC subsystem is shown, according to another exemplary embodiment.

Referring now to FIG. 9B, another demand limiting control system 950 for controlling an HVAC subsystem is shown, according to another exemplary embodiment. The demand limiting control system 950 of FIG. 9B includes different setpoint logic. FIG. 9B may be appropriate where critical peak pricing is used by the utility such that the energy setpoint can be a constant value during the demand limiting period (e.g., heat transfer rate setpoint $\dot{Q}_{sp}$) such that the maximum temperature is approached at the end of a demand limiting period. FIG. 9A, by contrast, may be more appropriate where pricing is varying such that the optimal power use is time varying.

Demand limiting control system 950 may be implemented by any number of combinations of software and/or hardware. In some embodiments, demand limiting control system 950 may be used as part of a building management system. For example, demand limiting control system 950 may be used to regulate a plant 960, such as the HVAC subsystem shown in FIG. 9B. Demand limiting control system 950 is generally shown to include controller 952, plant 960, and setpoint logic 980. Although controller 952, plant 960, and setpoint logic 980 are shown as being separate in FIG. 9B, their functions may be implemented in a single device or across multiple devices. For example, while controller 952 and setpoint logic 980 are shown as being separate, they may be implemented in the same processing device or their functions may be performed across multiple processing devices.

Demand limiting control system 950 is shown to include plant 960. Plant 960 represents any number of devices that may be subject to demand limiting. In some cases, the devices may be part of a subsystem for a building management system. For example, plant 960 may be an HVAC subsystem that includes one or more HVAC devices (e.g., VAV boxes, AHUs, chillers, mixers, etc.). Each device may also be associated with one or more device controllers that regulate the functions of the device. For example, plant 960 may include one or more VAV box controllers 964, which control the operations of one or more VAV boxes. The VAV boxes may also be provided air by one or more mixers, such as those found in an AHU. Each mixer may have an associated mixer controller, such as mixer controllers 968, 970. In addition to controllers associated with physical devices, plant 960 may include controllers for a particular region of space, such as one or more zone controllers 966. Zone controllers 966 may be used to balance AHU heat load. In other examples, plant 960 may include controllers that regulate building temperatures at the zone or chiller plant level.

The various controllers in plant 960 may operate their associated physical devices relative to one or more setpoints. For example, VAV box controllers 964 may regulate one or more VAV boxes relative to a desired temperature setpoint (e.g., zone temperature setpoint $T_{zn,sp}$). Zone controllers 966 may use temperature and airflow readings (e.g., supplied air temperature $T_{sa}$ and airflow rate $\dot{m}$) from the VAV boxes to provide feedback control over the VAV boxes relative to the temperature setpoint. Accordingly, plant 960 itself may be seen as having one or more output parameters that may be controlled by regulating one or more input parameters. For example, a zone temperature setpoint may be provided to plant 960, which uses it as part of its internal controls. Output parameters from plant 960, such as the temperature and flow rate of mixed air, may then vary with the provided zone temperature setpoint.

Demand limiting control system 950 may also include controller 952. Controller 952 uses comparator 953 to compare a value associated with measurements from plant 960 (e.g., heat transfer rate $\dot{Q}$) to an energy use setpoint (e.g., heat transfer rate setpoint $\dot{Q}_{sp}$). Controller 952 uses this comparison to provide demand limiting control over plant 960 by generating one or more manipulated variables. For example, controller 952 may generate a zone temperature setpoint (temperature setpoint $T_{zn,sp}$) used as an input parameter by plant 960. Measurements taken at the mixer of plant 960, such as temperature or airflow, may also be used to provide feedback to controller 952. In some embodiments, controller 952 may use a PID or feedforward with feedback control strategy to improve its response.

As shown, comparator 953 may compare the measurements from plant 910 (e.g., supply air temperature $T_{sa}$, mixer airflow rate $m_{ma}$, and mixer temperature $T_{ma}$) to a value derived from the measurements (e.g., heat transfer rate $\dot{Q}$). In such a case, controller 952 may use estimator 958 to estimate the value using the measurements from plant 960. In other embodiments, other variables and measured values associated with an energy use may be used by controller 952.

Command generator 954 receives the comparison from comparator 953 and uses it to begin a process for generating a manipulated variable for plant 960. Command generator 954 may also use a parameter conversion module 956 to convert a change command % setpoints unique to different zones of plant 952. For example, command generator 954 may provide a command % to module 956 for regulating the particular temperature setpoints provided to plant 960. Parameter conversion module 956 can constrain the temperature setpoints for each zone based on different Tmin or Tmax for the specific zone. In some embodiments, command generator 954 may only update the control command periodically (e.g., every five minutes, every fifteen minutes, every half hour, etc.). During a demand limiting period, the temperature setpoint may be regulated such that the highest zone temperature at the end of the demand limiting period equals a maximum zone temperature. In this case, command generator 954 and parameter characteristic 956 may then operate to maintain the proper temperature trajectory during a demand limiting period.

Demand limiting control system 950 is further shown to include setpoint logic 980. Setpoint logic 980 generates one or more energy use setpoints used by comparator 953 of controller 952. In one embodiment, setpoint logic 980 operates to derive a daily demand setpoint for use by comparator 953. For example, the daily demand setpoint may be a heat transfer rate setpoint, if plant 960 is an HVAC subsystem. In general, the energy use setpoint may be used by controller 952 to regulate the rate of heat transfer for plant 960 by controlling the temperature setpoint for plant 960.

In some embodiments, setpoint logic 980 may operate to determine an energy use setpoint that causes the highest zone temperature in plant 960 to reach a maximum zone temperature at the end of a demand limiting period. If so, setpoint logic 980 may use comparator 984 to determine the maximum zone temperature from the end of the previous demand limiting period. In this way, setpoint logic 980 is able to self-adapt, in order to optimize the energy use setpoint for future demand limiting periods.

Setpoint logic 980 may also utilize a previously used setpoint as part of its logic, in order to determine if the previous energy use setpoint was successful. If so, the previously used setpoint may be stored for later use in memory or delay module 986 may be used to implement a feedback time delay (e.g., by an hour, a day, etc.). Setpoint generator 982 determines if the previous setpoint was successful by comparing the previous maximum zone temperature from comparator 984 equaled that of a maximum zone temperature setpoint. If the values differ, setpoint generator 982 may use the maximum zone temperature setpoint from comparator 984, the previous energy use setpoint, and temperature constraints (e.g., a maximum zone temperature setpoint $T_{zn,max}$ and a minimum zone temperature setpoint $T_{zn,min}$) to adjust the energy use setpoint. In this way, demand limiting control system 950 is able to automatically optimize the demand limiting control provided over the building HVAC system in plant 960. Additionally setpoint logic 980 could be used to calculate an energy budget which is sent to an optimum power setpoint trajectory 932 to make demand limiting control system 950 appropriate for real-time pricing.

Configurations of Various Exemplary Embodiments

The construction and arrangements of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A feedback controller for controlling power consumption by an HVAC system of a building during a demand limiting period, the controller comprising:
    a processing circuit configured to generate a value of a manipulated variable for adjusting the operation of an HVAC device, wherein the processing circuit comprises:
    an error analyzer configured to receive an energy use setpoint as a reference input and to receive a measured energy use as a measured input, wherein the error analyzer is further configured to compare the reference input and the measured input, and to use the comparison to determine an error value;
    an error corrector configured to receive the error value and to use the error value to generate the value of the manipulated variable during the demand limiting period; and
    an energy use setpoint generator configured to calculate the energy use setpoint using a demand limiting technique subject to a constraint defining a threshold value for a condition affected by the energy use setpoint.

2. The feedback controller of claim 1, wherein the constraint defines a comfort threshold and the energy use setpoint is estimated to result in the condition affected by the energy use setpoint reaching the comfort threshold at the end of the demand limiting period.

3. The feedback controller of claim 1, wherein the energy use setpoint generator is configured to calculate the energy use setpoint using a history of values for the energy use setpoint from a previous demand limiting period and a history of values for the condition affected by the energy use setpoint from the previous demand limiting period to estimate the condition at the end of the current demand limiting period.

4. The feedback controller of claim 1, wherein the energy use setpoint generator is configured to determine a probability that the calculated energy use setpoint is successful in maintaining the condition affected by the energy use setpoint within an acceptable range of values during the demand limiting period;
    wherein the constraint defines a probability threshold and the energy use setpoint is estimated to result in the determined probability being greater than or equal to the probability threshold.

5. The feedback controller of claim 1, wherein the energy use setpoint generator is configured to calculate an expected cost resulting from the energy use setpoint;
    wherein the constraint defines a cost threshold and the energy use setpoint is estimated to result in the expected cost being less than or equal to the cost threshold at the end of the demand limiting period.

6. The feedback controller of claim 1, wherein the energy use setpoint generator is configured to:
    generate an objective function using a difference between an expected gain resulting from the energy use setpoint and an expected loss resulting from the energy use setpoint; and
    calculate the energy use setpoint by optimizing the objective function.

7. The feedback controller of claim 6, wherein:
the expected gain is a savings realized if the energy use setpoint is successful in maintaining the condition affected by the energy use setpoint within an acceptable range of values during the demand limiting period multiplied by the probability of success; and
the expected loss is a cost incurred if the energy use setpoint fails to maintain the condition affected by the energy use setpoint within the acceptable range of values during the demand limiting period multiplied by the probability of failure.

8. The feedback controller of claim 1, wherein the energy use setpoint generator is configured to calculate the energy use setpoint using a cost function that minimizes a financial cost of electrical power;
    wherein the cost function comprises a probability that the energy use setpoint is successful in maintaining the condition affected by the energy use setpoint within an acceptable range of values during the demand limiting period.

9. A method for controlling power consumption by an HVAC system of a building during a demand limiting period, the method comprising:
    using an energy use setpoint as a reference input for a feedback controller;
    using a measured energy use as a measured input for the feedback controller;
    using the feedback controller to generate a manipulated variable output for adjusting the operation of an HVAC device during the demand limiting period; and
    calculating the energy use setpoint using a demand limiting technique subject to a constraint defining a threshold value for a condition affected by the energy use setpoint.

10. The method of claim 9, wherein the constraint defines a comfort threshold and the energy use setpoint is estimated to result in the condition affected by the energy use setpoint reaching the comfort threshold at the end of the demand limiting period.

11. The method of claim 9, wherein calculating the energy use setpoint comprises using a history of values for the energy use setpoint from a previous demand limiting period and a history of values for the condition affected by the energy use setpoint from the previous demand limiting period to estimate the condition at the end of the current demand limiting period.

12. The method of claim 9, further comprising determining a probability that the calculated energy use setpoint is successful in maintaining the condition affected by the energy use setpoint within an acceptable range of values during the demand limiting period;
    wherein the constraint defines a probability threshold and the energy use setpoint is estimated to result in the determined probability being greater than or equal to the probability threshold.

13. The method of claim 9, further comprising calculating an expected cost resulting from the energy use setpoint;
    wherein the constraint defines a cost threshold and the energy use setpoint is estimated to result in the expected cost being less than or equal to the cost threshold at the end of the demand limiting period.

14. The method of claim 9, further comprising generating an objective function using a difference between an expected gain resulting from the energy use setpoint and an expected loss resulting from the energy use setpoint;
    wherein calculating the energy use setpoint comprises optimizing the objective function.

15. The method of claim 14, wherein:
the expected gain is a savings realized if the energy use setpoint is successful in maintaining the condition affected by the energy use setpoint within an acceptable range of values during the demand limiting period multiplied by the probability of success; and
the expected loss is a cost incurred if the energy use setpoint fails to maintain the condition affected by the energy use setpoint within the acceptable range of values during the demand limiting period multiplied by the probability of failure.

16. The method of claim 9, wherein calculating the energy use setpoint comprises using a cost function that minimizes a financial cost of electrical power;
    wherein the cost function comprises a probability that the energy use setpoint is successful in maintaining the condition affected by the energy use setpoint within an acceptable range of values during the demand limiting period.

17. A system for controlling power consumption by an HVAC system of a building during a demand limiting period, the system for controlling power consumption comprising:
    a feedback controller configured to use a difference between an energy use setpoint and a measured energy use to generate a value of a manipulated variable for adjusting the operation of an HVAC device during a demand limiting period; and
    an energy use setpoint generator configured to calculate the energy use setpoint using a demand limiting technique subject to a constraint defining a threshold value for a condition affected by the energy use setpoint.

18. The system of claim 17, wherein the constraint defines a comfort threshold and the energy use setpoint is estimated to result in the condition affected by the energy use setpoint reaching the comfort threshold at the end of the demand limiting period.

19. The system of claim 17, wherein the energy use setpoint generator is configured to calculate an expected cost resulting from the energy use setpoint;
    wherein the constraint defines a cost threshold and the energy use setpoint is estimated to result in the expected cost being less than or equal to the cost threshold at the end of the demand limiting period.

20. The system of claim 17, wherein the energy use setpoint generator is configured to determine a probability that the calculated energy use setpoint is successful in maintaining the condition affected by the energy use setpoint within an acceptable range of values during the demand limiting period;
    wherein the constraint defines a probability threshold and the energy use setpoint is estimated to result in the determined probability being greater than or equal to the probability threshold.

* * * * *